United States Patent
Jiang et al.

(10) Patent No.: US 9,455,590 B2
(45) Date of Patent: Sep. 27, 2016

(54) CHARGING CONTROL CIRCUIT, CHARGING APPARATUS, CHARGING CONTROL METHOD AND CHARGING METHOD

(71) Applicant: Actions (Zhuhai) Technology Co., Limited., Zhuhai (CN)

(72) Inventors: Li Jiang, Zhuhai (CN); Jialiang Dai, Zhuhai (CN); Jiang Xiong, Zhuhai (CN)

(73) Assignee: ACTIONS (ZHUHAI) TECHNOLOGY CO., LIMITED, Zhuhai, Guangdong (CN)

( * ) Notice: Subject to any disclaimer, the term of this patent is extended or adjusted under 35 U.S.C. 154(b) by 121 days.

(21) Appl. No.: 14/415,077

(22) PCT Filed: Aug. 13, 2013

(86) PCT No.: PCT/CN2013/081343
§ 371 (c)(1),
(2) Date: Jan. 15, 2015

(87) PCT Pub. No.: WO2014/044095
PCT Pub. Date: Mar. 27, 2014

(65) Prior Publication Data
US 2015/0188351 A1  Jul. 2, 2015

(30) Foreign Application Priority Data

Sep. 20, 2012 (CN) .......................... 2012 1 0352290

(51) Int. Cl.
*H02J 7/00* (2006.01)
(52) U.S. Cl.
CPC ............ *H02J 7/0077* (2013.01); *H02J 7/0029* (2013.01); *H02J 7/0052* (2013.01); *H02J 7/0086* (2013.01); *H02J 2007/0037* (2013.01)
(58) Field of Classification Search
CPC ........... H02J 2007/0037; H02J 7/0029; H02J 7/0052; H02J 7/0077; H02J 7/0086
USPC .................................................. 320/107, 162
See application file for complete search history.

(56) References Cited

U.S. PATENT DOCUMENTS

| | | | |
|---|---|---|---|
| 2004/0195996 A1 | 10/2004 | Nishida | |
| 2009/0096427 A1 | 4/2009 | Yang | |
| 2011/0309802 A1* | 12/2011 | Hoffman | H02J 7/0072 320/163 |
| 2012/0007554 A1* | 1/2012 | Kanamori | B60L 11/1824 320/109 |
| 2012/0169271 A1* | 7/2012 | Dvorkin | G01K 13/00 320/106 |

FOREIGN PATENT DOCUMENTS

| | | |
|---|---|---|
| CN | 101546916 | 9/2009 |
| CN | 101702528 | 5/2010 |
| CN | 102270855 | 12/2011 |

* cited by examiner

*Primary Examiner* — Nathaniel Pelton
(74) *Attorney, Agent, or Firm* — Hamre, Schumann, Mueller & Larson, P.C.

(57) ABSTRACT

A charging control circuit (23, 33, 43, 53), a charging apparatus (2) comprising the charging control circuit (23, 33, 43, 53), a charging control method and a charging method comprising steps in the charging control method. The charging control circuit (23, 33, 43, 53) and the charging control method can provide a variable current reference (Iref_g), and limit the variable current reference (Iref_g) to a minimum current value in a periodically triggered interrupt duration, so as to enable an output voltage (Vout) to be closer to a battery core voltage (V0) when the interrupt duration ends. Therefore, by taking whether the output voltage (Vout) obtained when the interrupt duration ends approximately reaches a calibration voltage reference (Vref_s) as a condition, the charging is triggered to terminate, so that the defect of insufficient charging can be overcome, and instantaneous uprush of the output current (Iout) can be further limited by use of the variable current reference (Iref_g) in the charging duration. Moreover, the charging control circuit (23, 33, 43, 53) and the charging control method can further provide a variable voltage reference (Vref_g), and allow the output voltage (Vout) to exceed the calibration voltage reference (Vref_s) in the charging duration by improving the variable voltage reference (Vref_g) after it is detected that the output voltage (Vout) is far from reaching the calibration voltage reference (Vref_s) when the interrupt duration ends, thereby improving the charging speed.

11 Claims, 14 Drawing Sheets

CHARGING CONTROL CIRCUIT, CHARGING APPARATUS, CHARGING CONTROL METHOD AND CHARGING METHOD

The present application is a US National Stage of International Application No. PCT/CN2013/081343, filed Aug. 13, 2013, designating the United States, and claiming the benefit of Chinese Patent Application No. 201210352290.7, filed with the Chinese Patent Office on Sep. 20, 2012 and entitled "charging control circuit, charging apparatus, charging control method and charging method", which are hereby incorporated by reference in its their entireties.

FIELD

The present invention relates to the field of charging and particularly to a charging control circuit and a charging apparatus, and a charging control method and a charging method, applicable to a charging scheme with adjustable output voltage and output current.

BACKGROUND

FIG. 1 is a schematic structural diagram of an example of a charging apparatus in the prior art. As illustrated in FIG. 1, the charging apparatus 1 configured to charge a battery 100 includes a charging execution circuit 11, a charging protection circuit 12 and a charging control circuit 13.

Where the charging execution circuit 11 is configured to generate output voltage Vout and output current Iout at a charging output terminal thereof, and to adjust the generated output voltage Vout and output current Iout, in a period of charging.

Particularly the charging execution circuit 11 includes differential amplifiers 111 and 112, a voltage selector 113 and an adjustable switch 114 (which is a PMOS in this context merely by way of an example); and the negative input terminal of the differential amplifier 111 is a current reference input terminal of the charging execution circuit 11, the negative input terminal of the differential amplifier 112 is a voltage reference input terminal of the charging execution circuit 11, and the drain D of the PMOS 114 is the charging output terminal of the charging execution circuit 11.

The negative input terminal of the differential amplifier 111 receives an input nominal current reference Iref_s, the other positive input terminal of the differential amplifier 111 receives the output current Iout fed back at the charging output terminal of the differential amplifier 111, and the output terminal of the differential amplifier 111 outputs a control signal Ctrl_I at a positive voltage value, where the positive voltage value of the control signal Ctrl_I indicates a current difference of the output current Iout from the nominal current reference Iref_s;

The negative input terminal of the differential amplifier 112 receives an input nominal voltage reference Vref_s, the other positive input terminal of the differential amplifier 112 receives the output voltage Vout outputting by the charging output terminal of the differential amplifier 111, and the output terminal of the differential amplifier 112 outputs a control signal Ctrl_V at a positive voltage value, where the positive voltage value of the control signal Ctrl_V indicates a voltage difference of the output voltage Vout from the nominal voltage reference Vref_s;

The voltage selector 113 receives the control signal Ctrl_I and the control signal Ctrl_V, and the voltage selector 113 further receives a control signal Ctrl_P output by the charging protection circuit 12 based on a charging status signal S (e.g., a signal indicating the status of a power source Vcc0, temperature inside the charging apparatus 1, temperature inside the battery 100, etc.); and, where a positive voltage value of the control signal Ctrl_P indicates abnormality or not, and typically the positive voltage value of the control signal Ctrl_P will become higher upon abnormality; and the voltage selector 113 selects the highest one of the positive voltage values of the control signal Ctrl_I, the control signal Ctrl_V and the control signal Ctrl_P (alternatively the lowest one can be selected in a practical application for a different characteristic of an element although the highest one is selected in this context by way of an example) and sets the gate G of the PMOS 114 at the selected highest positive voltage value; and The source S of the PMOS 114 is connected with the input power source Vcc0, and the drain D of the PMOS 114 is connected with the battery 100 and configured to generate the output current Iout and the output voltage Vout; and the conductivity between the source S and the drain D of the PMOS 114 can be adjusted with the varying positive voltage value of the gate G of the PMOS 114 to thereby adjust the output current Iout; and correspondingly since the output voltage Vout is equal to the sum of the kernel voltage V0 of the battery 100 and the voltage drop across the inner resistor R0 of the battery 100, and both the kernel voltage V0 and the voltage drop across the inner resistor R0 are dependent upon the output current Iout, so the output voltage Vout can be adjusted together with the adjustment of the output current Iout.

The charging control circuit 13 is configured to control charging to be terminated based on whether the output current Iout is lower than a nominal current reference Iref_s'.

Particularly the charging control circuit 13 includes a comparator 130. The negative input terminal of the comparator 130 receives the output current Iout fed back at the charging output terminal of the charging execution circuit 11, the other positive input terminal of the comparator 130 receives the nominal current reference Iref_s', and the output terminal of the comparator 130 generates a charging termination signal Fin_a; and when the output current Iout is lower than the nominal current reference Iref_s', the charging termination signal Fin_a is set at an active high level to trigger termination of charging by the charging execution circuit 11.

Where the nominal current reference Iref_s is a well-known current reference for constant-current charging, the nominal current reference Iref_s' is a well-known current reference for termination of charging, and the nominal current reference Iref_s is higher than the nominal current reference Iref_s'; and the nominal voltage reference Vref_s is a well-known voltage reference for termination of charging.

An underlying operation principle of the existing charging apparatus 1 as illustrated in FIG. 1 will be described in details with reference to the definitions of the nominal current reference Iref_s, the nominal current reference Iref_s' and the nominal voltage reference Vref_s. Since the charging protection circuit 12 is optional instead of being necessary, the control signal Ctrl_P output by the charging protection circuit 12 will be maintained all the time at a lower positive voltage value indicating no abnormality in the following detailed description.

In a charging start phase:

The output current Iout is far lower than the nominal current reference Iref_s, and the output voltage Vout is far lower than the nominal voltage reference Vref_s, and at this time both the control signal Ctrl_I and the control signal Ctrl_V are at lower positive voltage values so that the voltage selector 112 will also set the gate G of the PMOS 114 at a lower positive voltage value; and then since the source S of the PMOS 114 is pulled high by the input power source Vcc0, the voltage difference VGS between the gate and the source of the PMOS 114 is at a negative value and lower than the cutoff voltage of the PMOS 114 so that the PMOS 114 becomes maximally conductive and the output current Iout becomes higher;

When the output current Iout becomes higher, the positive voltage value of the control signal Ctrl_I will be higher than that of the control signal Ctrl_V, and correspondingly the gate G of the PMOS 114 will be set by the voltage selector 112 at the positive voltage value of the control signal Ctrl_I, and the conductivity of the PMOS 114 will also be controlled by the positive voltage value of the Ctrl_I; and After some settling period of time, the conductivity of the PMOS 114 controlled by the positive voltage value of the control signal Ctrl_I will have the output current Iout maintained at the nominal current reference Iref_s, and thereafter a constant-current charging phase will commence.

In the constant-current charging phase:

The inner voltage V0 of the battery 100 will gradually become higher, and correspondingly the output voltage Vout will also gradually become higher from a lower voltage value far lower than the nominal voltage reference Vref_s; and since the positive voltage value of the control signal Ctrl_I will be maintained all the time at a positive voltage value indicating that the output current Iout reaches the nominal current reference Iref_s, the positive voltage value of the control signal Ctrl_V will be still lower than the positive voltage value of the control signal Ctrl_I as long as the output voltage Vout has not reached the nominal voltage reference Vref_s; and When the output voltage Vout reaches and is slightly higher than the nominal voltage reference Vref_s, the positive voltage value of the control signal Ctrl_V will be higher than the positive voltage value of the control signal Ctrl_I, and then at this time the gate G of the PMOS 114 will be set by the voltage selector 112 at a higher positive voltage value of the control signal Ctrl_V so that the voltage difference VGS between the gate and the source of the PMOS 114 lower than the cutoff voltage will become higher and consequently the PMOS 114 will become less conductive and the output current Iout will become lower, and thereafter a constant-voltage charging phase will commence.

In the constant-voltage charging phase:

The output voltage Vout will be equal to the nominal voltage reference Vref_s due to a negative feedback; and When the output voltage Iout is lower than the nominal current reference Iref_s, the charging termination signal Fin_a becomes an active high level to thereby trigger termination of charging (how to trigger termination of charging will be of no interest in this context, and those skilled in the art have appreciated a number of particular implementations thereof, so a repeated description thereof will be omitted here).

Charging has been terminated so far.

As can be apparent from the description above, the charging execution circuit 11 in the existing charging apparatus 1 can be used to implement a charging scheme in which the output voltage Vout and the output current Iout is adjustable, and the charging control circuit 13 thereof can be used to control charging to be terminated, but since the charging control circuit 13 in the existing charging apparatus 1 may unreasonably control charging to be terminated and the charging execution circuit 11 thereof can not be controlled to adjust the output voltage Vout and the output current Iout, the following drawbacks may arise:

1. Whether the battery 100 has been fully charged is typically reflected by whether the kernel voltage V0 of the battery 100 reaches the nominal voltage reference Vref_s, but it is judged in the existing charging apparatus 1 when the charging termination signal Fin_a becomes active only dependent upon whether the output current Iout is lower than the nominal current reference Iref_s' so that such a situation may occur that the output current Iout is lower than the nominal current reference Iref_s' whereas the kernel voltage V0 of the battery 100 has been far from reaching the nominal voltage reference Vref_s, thus resulting in a drawback of insufficient charging;

2. When the kernel voltage V0 of the battery 100 has been far from reaching the nominal voltage reference Vref_s, it indicates a need for the battery 100 to be charged for a further long period of time, but the output current Iout in the existing charging apparatus 1 constantly becomes lower in the constant-voltage charging phase so that such a situation may occur that the kernel voltage V0 of the battery 100 has been far from reaching the nominal voltage reference Vref_s whereas the output current Iout is very low, thus resulting in a drawback of excessively slow charging; and 3. There may be an instantaneous up-rush of the output current Iout in the charging start phase, and alike there may also easily be an instantaneous up-rush of the output current Iout in a charging restart phase after a temporary stop of charging is triggered by the control signal Ctrl_P of the charging protection circuit 12 or in a contact-again phase after the battery 100 is disconnected from the charging output terminal, so that there may easily be an impact on the input power source Vcc0 and the battery 100, thus resulting in a drawback of low reliability of charging.

Moreover there is also such a corresponding charging method in the prior art under the same principle as the charging apparatus 1 that output voltage Vout and output current Iout can be generated, and the generated output voltage Vout and output current Iout can be adjusted, in a period of charging, and charging can be controlled to be terminated based on whether the output current Iout is lower than a nominal current reference Iref_s'. Alike this charging method may unreasonably control charging to be terminated and can not control the output voltage Vout and the output current Iout to be adjusted and consequently also suffer from the drawbacks above.

SUMMARY

In view of this, the invention provides a charging control circuit and a charging apparatus, and a charging control method and a charging method.

Based on a first aspect of the invention, there is provided a charging control circuit configured to control a charging execution circuit to adjust output voltage and output current generated at a charging output terminal thereof and to control charging by the charging execution circuit to be terminated, and the charging control circuit includes a current adjustment module and a detection control module, and wherein:

the current adjustment module is configured to adjust an externally input first current reference and to output a second current reference as a result of adjustment to a current reference input terminal of the charging execution circuit to control the charging execution circuit to adjust the output voltage and the output current, wherein a lowest current value of the second current reference is lower than the first current reference, and a highest current value of the second current reference is equal to the first current reference; and the detection control module is configured to trigger periodically interruption of charging, to control the current adjustment module and to generate a charging termination signal, wherein the second current reference is limited at the lowest current value by controlling the current adjustment module in a period of interruption, and the limitation of the second current reference is removed by controlling the current adjustment module in a period of charging spaced by periods of interruption; and when the output voltage lower than an externally input first voltage reference by a voltage difference lower than a preset first voltage threshold is detected at the end of the period of interruption, to set the charging termination signal active to trigger termination of charging.

Optionally when the output current lower than the second current reference by a current difference lower than a first current threshold is detected in the period of charging, if the second current reference has not reached the highest current value, then the second current reference with the limitation removed is adjusted up by the current adjustment module;

when the current difference higher than or equal to a preset second current threshold and lower than a preset third current threshold is detected in the period of charging, if the second current reference has not reached the lowest current value, then the second current reference with the limitation removed is adjusted down by the current adjustment module; and when the current difference higher than or equal to the third current threshold is detected in the period of charging, if the second current reference has not reached the lowest current value, then the second current reference with the limitation removed is reset to the lowest current value by the current adjustment module; and wherein the first current threshold is lower than the second current threshold, and the second current threshold is lower than the third current threshold; and/or The charging control circuit further includes a voltage adjustment module configured to adjust the first voltage reference and to output a second voltage reference as a result of adjustment to a voltage reference input terminal of the charging execution circuit to control the charging execution circuit to adjust the output voltage and the output current, and wherein the highest voltage value of the second voltage reference is higher than the first voltage reference, and the lowest voltage value thereof is equal to the first voltage reference; and the detection control circuit is further configured to control the voltage adjustment module so that:

when the voltage difference higher than or equal to the first voltage threshold and lower than a second voltage threshold is detected at the end of the period of interruption, if the second voltage reference has not reached the lowest voltage value, then the second voltage reference is adjusted down by the voltage adjustment module;

when the voltage difference higher than a third voltage threshold is detected at the end of the period of interruption, if the second voltage reference has not reached the highest voltage value, then the second voltage reference is adjusted up by the voltage adjustment module; and wherein the first voltage threshold is lower than the second voltage threshold, and the second voltage threshold is lower than the third voltage threshold.

Based on a second aspect of the invention, there is provided a charging apparatus including the charging control circuit described above.

Based on a second aspect of the invention, there is provided a charging control method for control adjustment of output voltage and output current generated in charging and triggering termination of charging, where the charging control method includes:

the operation a1 of adjusting an input first current reference and outputting a second current reference as a result of adjustment to control the output voltage and the output current to be adjusted, wherein the lowest current value of the second current reference is lower than the first current reference, and the highest current value thereof is equal to the first current reference; and the operation b0 of triggering periodically interruption of charging, controlling the operation a1 and generating a charging termination signal, wherein the second current reference is limited at the lowest current value by controlling the current adjustment module in a period of interruption, and the limitation of the second current reference is removed by controlling the current adjustment module in a period of charging spaced by periods of interruption; and when the output voltage lower than an externally input first voltage reference by a voltage difference lower than a preset first voltage threshold is detected at the end of the period of interruption, setting the charging termination signal active to trigger termination of charging.

Optionally when the output current lower than the second current reference by a current difference lower than a first current threshold is detected in the period of charging, if the second current reference has not reached the highest current value, then the second current reference with the limitation removed is adjusted up by the operation a1;

when the current difference higher than or equal to a preset second current threshold and lower than a preset third current threshold is detected in the period of charging, if the second current reference has not reached the lowest current value, then the second current reference with the limitation removed is adjusted down by the operation a1; and when the current difference higher than or equal to the third current threshold is detected in the period of charging, if the second current reference has not reached the lowest current value, then the second current reference with the limitation removed is reset to the lowest current value by the operation a1; and wherein the first current threshold is lower than the second current threshold, and the second current threshold is lower than the third current threshold; and/or The charging control method further includes the operation a2 of adjusting the first voltage reference and outputting a second voltage reference as a result of adjustment to control the output voltage and the output current to be adjusted, wherein the highest voltage value of the second voltage reference is higher than the first voltage reference, and the lowest voltage value thereof is equal to the first voltage reference; and the operation b0 is further configured to control the operation a2 so that:

when the voltage difference higher than or equal to the first voltage threshold and lower than a second voltage threshold is detected at the end of the period of interruption, if the second voltage reference has not reached the lowest voltage value, then the second voltage reference is adjusted down by the operation a2;

when the voltage difference higher than a third voltage threshold is detected at the end of the period of interruption, if the second voltage reference has not reached the highest voltage value, then the second voltage reference is adjusted up by the operation a2; and wherein the first voltage threshold is lower than the second voltage threshold, and the second voltage threshold is lower than the third voltage threshold.

Based on a fourth aspect, there is provided a charging method including the operations in the charging control method described above.

As can be apparent, the invention can provide a second current reference adjustable to be lower than or equal to a nominal first current reference and limit the second current reference at the lowest current value in periodically triggered periods of interruption so that output voltage is closer to the kernel voltage of a battery, and thus if the output voltage which has nearly reached a nominal first voltage reference is detected at the end of periods of interruption, then it can be approximately considered that the kernel voltage of the battery has nearly reached the nominal first voltage reference, so that the invention triggers termination of charging on the condition that the output voltage has nearly reached the nominal first voltage reference to thereby alleviate the drawback of insufficient charging. Further preferably:

The invention can further provide a second voltage reference adjustable to be higher than or equal to the nominal first voltage reference; and if the output voltage which will nearly reach the nominal first voltage reference is detected at the end of periods of interruption, then it can be approximately considered that the kernel voltage of the battery will nearly reach the nominal first voltage reference, and the output voltage in the period of charging can be lowered by lowering the second voltage reference to thereby prevent over-charging; and if the output voltage which has been far from reaching the nominal first voltage reference is detected at the end of periods of interruption, then it can be approximately considered that the kernel voltage of the battery has been far from reaching the nominal first voltage reference, and the output voltage exceeding the nominal first voltage reference in the period of charging can be allowed by raising the second voltage reference to thereby speed up charging; and/or The invention can further refrain an instantaneous up-rush of output current by adjusting the second current reference in the period of charging.

DETAILED DESCRIPTION

In order to make the objects, technical solutions and advantages of the invention more apparent, the invention will be further described below in details with reference to the drawings and in connection with embodiments thereof.

First Apparatus Embodiment

Figure 1:
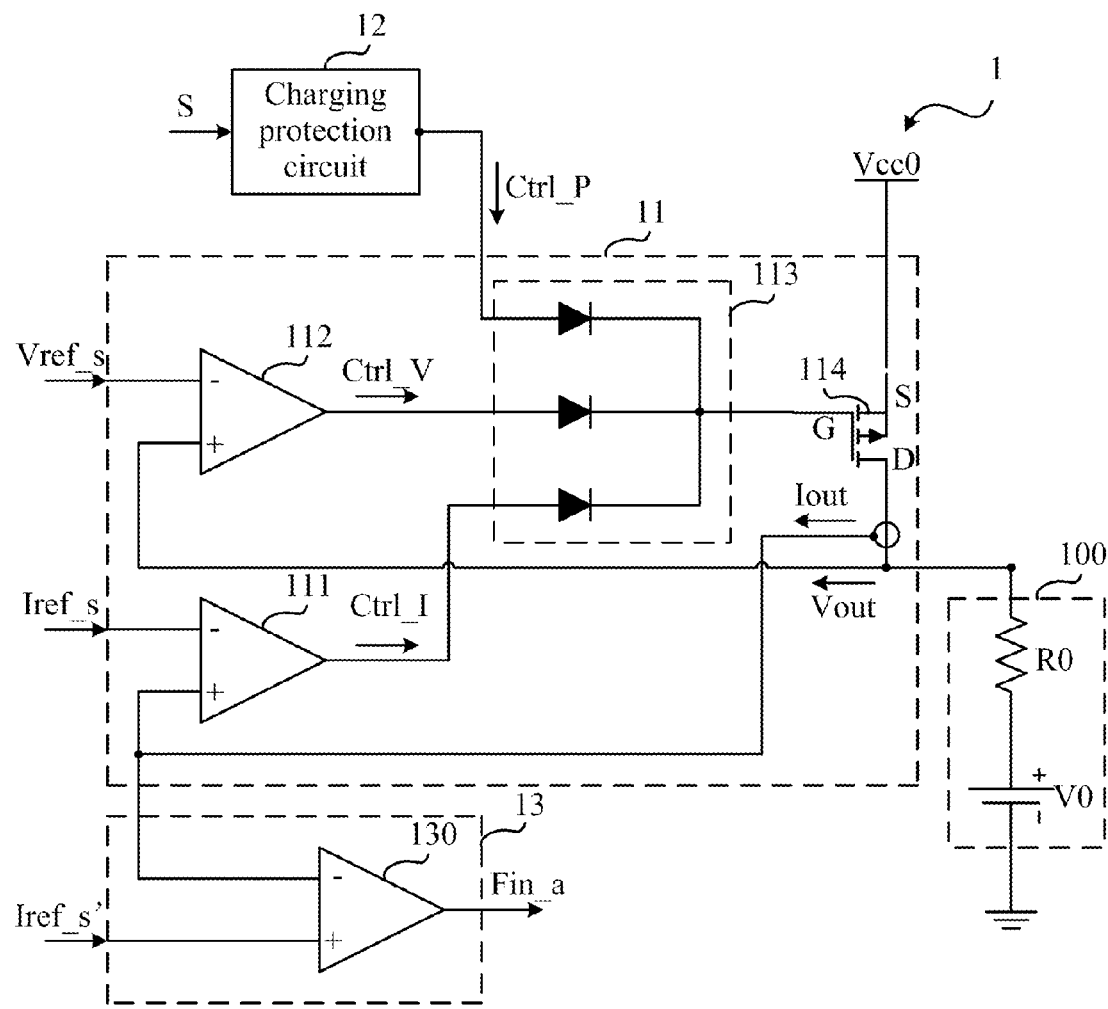
FIG. 1 is a schematic structural diagram of an example of a charging apparatus in the prior art.
Figure 2:
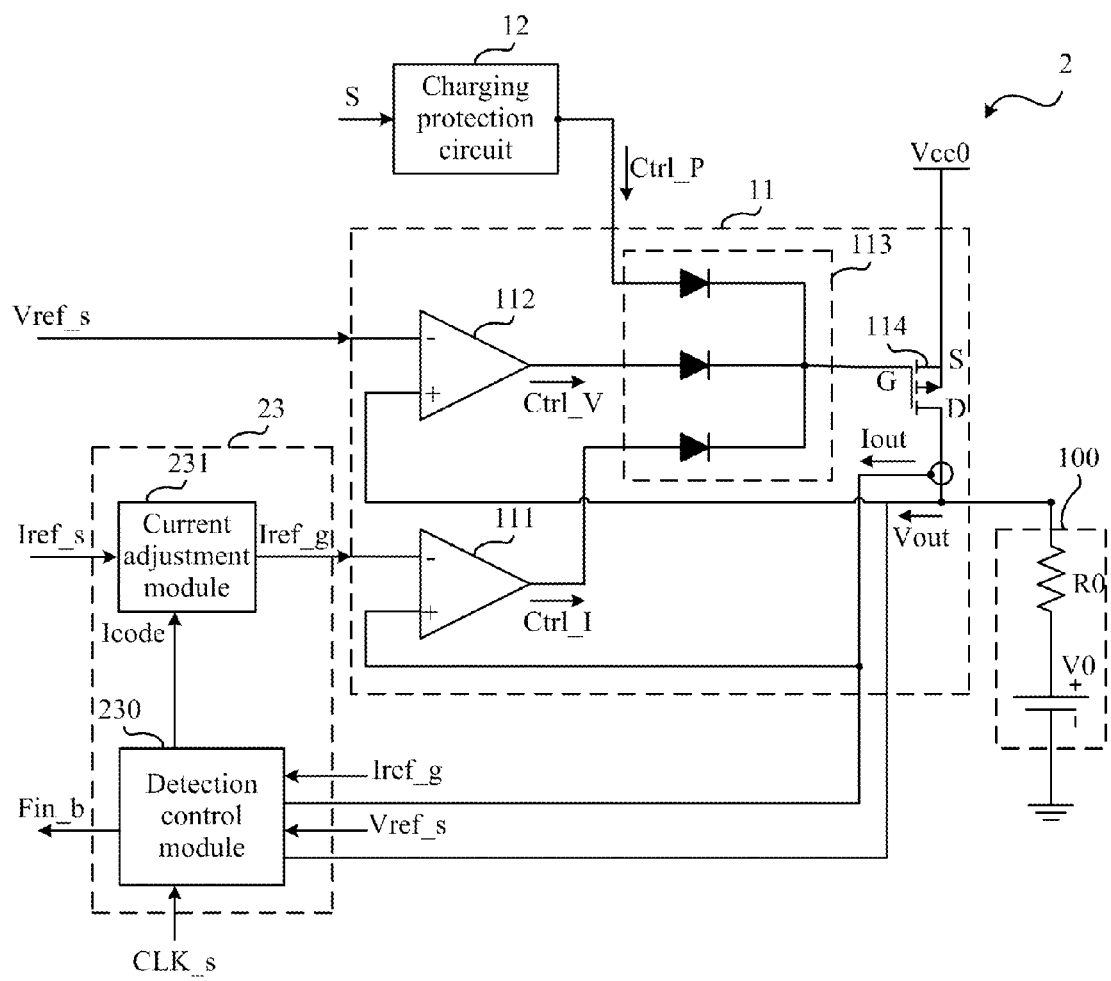
FIG. 2 is a schematic structural diagram of an example of a charging apparatus based on a first embodiment of the invention.

FIG. 2 is a schematic structural diagram of an example of a charging apparatus based on a first embodiment of the invention. As illustrated in FIG. 2, the charging apparatus 2 configured to charge a battery 100 includes a charging execution circuit 11, a charging protection circuit 12 and a charging control circuit 23.

Where the structures and operation principles of the charging execution circuit 11 and the charging protection circuit 12 are the same as those in the prior art, so a repeated description thereof will be omitted here, and the charging protection circuit 12 is optional instead of being necessary; and the charging control circuit 23 is configured to control the charging execution circuit 11 to adjust output voltage Vout and output current Iout generated at a charging output terminal thereof and to control charging by the charging execution circuit 11 to be terminated.

Particularly the charging control circuit 23 in the charging apparatus 2 in the present embodiment includes a current adjustment module 231 and a detection control module 230.

The current adjustment module 231 is configured to adjust an externally input nominal current reference Iref_s and to output a variable current reference Iref_g as a result of adjustment to a current reference input terminal of the charging execution circuit 11 (i.e., the negative input terminal of the differential amplifier 111) to control the charging execution circuit 11 to adjust the output voltage Vout and the output current Iout, where the lowest current value of the variable current reference Iref_g is lower than the nominal current reference Iref_s, and the highest current value of the variable current reference Iref_g is equal to the nominal current reference Iref_s; and The detection control module 230 is configured to trigger periodically interruption of charging, to control the current adjustment module 231 and to generate a charging termination signal Fin_b, where the variable current reference Iref_g is limited at the lowest current value above by controlling the current adjustment module 231 in a period of interruption, and the limitation above of the variable current reference Iref_g is removed by controlling the current adjustment module 231 in the period of charging spaced by periods of interruption; and when the output voltage Vout lower than an externally input nominal voltage reference Vref_s by a voltage difference lower than a preset voltage threshold Th_v1 (which approximately indicates that the kernel voltage V0 of the battery 100 has nearly reached the nominal voltage reference Vref_s) is detected at the end of the period of interruption, to set the charging termination signal Fin_b active to trigger termination of charging.

In the present embodiment, the lowest current value of the variable current reference Iref_g can be set by presetting an allowable difference range and setting the lowest current value on such a constraint condition that the difference of the output voltage Vout from the kernel voltage V0 of the battery (i.e., the voltage drop across the inner resistor R0 of the battery 100) is ensured to be in the allowable difference range. Of course the size of the preset allowable difference range may vary with different specifications, and correspondingly a particular value of the lowest current value will vary; and moreover a particular value of the lowest current value will also vary correspondingly for a different characteristic of the PMOS 114 or an alternative device with an adjustable switch function in place of the PMOS 114 even if the size of the preset allowable difference range is determined. However those skilled in the art with the knowledge of the function above of the lowest current value can determine a particular value of the lowest current value applicable to respective scenarios, so a detailed description thereof will be omitted here.

In the present embodiment, "the limitation above of the variable current reference Iref_g is removed" refers to the possibility to adjust freely the variable current reference Iref_g between the lowest current value and the highest current value of the variable current reference Iref_g in a particular adjustment scheme which can be set freely by those skilled in the art without any influence upon normal charging, for example, the variable current reference Iref_g is adjusted to the highest current value (i.e., the nominal current reference Iref_s) and maintained stably at the highest current value for the period of charging, or the variable current reference Iref_g is adjusted to a pre-selected default current value higher than the lowest current value and lower than or equal to the highest current value and maintained stably at the default current value for the period of charging, so a detailed description thereof will be omitted here.

With the charging control circuit 23 above, the current reference input terminal of the charging execution circuit 11 receives the variable current reference Iref_g instead of the constant nominal current reference Iref_s; and moreover in the present embodiment, the voltage reference input terminal of the charging execution circuit 11 (i.e., the negative input terminal of the differential amplifier 112) still receives the input nominal voltage reference Vref_s.

Since the variable current reference Iref_g will be limited to the lowest current value above in each period of interruption, the output current Iout will be higher and even far higher than the variable current reference Iref_g suddenly changed to the lowest current value each time the period of interruption commences; and correspondingly no matter whether the output voltage Vout at this time has not reached the nominal voltage reference Vref_s or has reached or been slightly higher than the nominal voltage reference Vref_s, the positive voltage value of the control signal Ctrl_I will be higher than the positive voltage value of the control signal Ctrl_V and control the PMOS 114 (i.e., the adjustable switch) to be turned off or weakly conductive so that the output current Iout will be dropped to be substantially equal to the variable current reference Iref_g limited at the lowest current value.

After the output current Iout is dropped to be substantially equal to the variable current reference Iref_g limited at the lowest current value:

If the output voltage Vout at this time has not reached the nominal voltage reference Vref_s, then the PMOS 114 is still controlled by the control signal Ctrl_I and maintained turned off or weakly conductive; and If the output voltage Vout at this time has reached or been slightly higher than the nominal voltage reference Vref_s, then such a situation may occur temporarily that the positive voltage value of the control signal Ctrl_V is higher than the positive voltage value of the control signal Ctrl_I, so even if the control signal Ctrl_V controls the PMOS 114 to be more conductive so that the output current Iout becomes higher slightly than the variable current reference Iref_g limited at the lowest current value, the positive voltage value of the control signal Ctrl_I will be higher than the positive voltage value of the control signal Ctrl_V again and control the PMOS 114 again to be less conductive;

Stated otherwise, after the output current Iout is maintained substantially equal to the variable current reference Iref_g limited at the lowest current value, this status of being substantially the same can be maintained for the period of interruption.

Then the lower the lowest current value, the lower the drop across the inner resistor R0 of the battery 100, i.e., the difference of the output voltage Vout from the kernel voltage V0 of the battery 100 will be lower, and correspondingly the output voltage Vout will be closer to the real kernel voltage V0 after the period of interruption, so the detection, at the end of the period of interruption, of a voltage difference by which the output voltage Vout is lower than the nominal voltage reference Vref_s, is equivalent to the approximate detection of a voltage difference by which the real kernel voltage V0 is lower than the nominal voltage reference Vref_s.

Thus the voltage difference above detected at the end of the period of interruption in the present embodiment can approximately reflect whether the battery 100 has been charged fully, and correspondingly whether to trigger termination of charging can be judged more accurately by the voltage difference above, and consequently the drawback of insufficient charging can be alleviated, in the present embodiment as compared with the prior art in which termination of charging is triggered on the condition of the sufficient output current Iout.

It shall be noted that although the voltage reference input terminal of the charging execution circuit 11 (i.e., the negative input terminal of the differential amplifier 112) receives the nominal voltage reference Vref_s in the present embodiment, those skilled in the art can appreciate from the following description of a third apparatus embodiment and a fourth apparatus embodiment that there will be no substantial influence upon the alleviation of the drawback of insufficient charging no matter whether the nominal voltage reference Vref_s is input at the voltage reference input terminal of the charging execution circuit 11.

The respective modules included in the charging control circuit 23 in the charging apparatus 2 based on the present embodiment will be described below in details.

Figure 3:
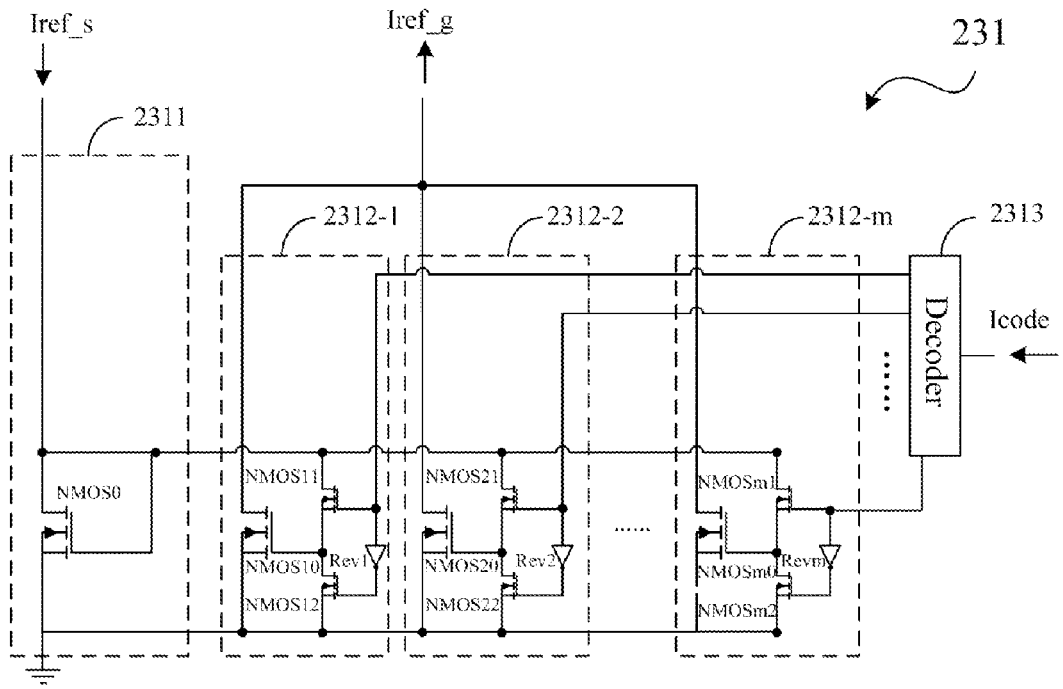
FIG. 3 is a schematic structural diagram of a preferred current adjustment module included in a charging control circuit in the charging apparatus based on the first embodiment of the invention.

FIG. 3 is a schematic structural diagram of a preferred current adjustment module included in the charging control circuit in the charging apparatus based on the first embodiment of the invention. As illustrated in FIG. 3, the current adjustment module 231 embodied in a variable-gain current mirror structure includes 2m adjustment shifts, and the current adjustment module 231 includes a current mirror trunk 2311, m current mirror branches 2312-1 to 2312-m and a m-bit decoder 2313, where m represents a positive integer higher than or equal to 1.

The current mirror trunk 2311 includes an NMOS0. The drain D of the NMOS0 is the input terminal of the current mirror trunk 2311 and connected with the input terminal of the current adjustment module 231 to receive the nominal current reference Iref_s; the source S of the NMOS0 is the output terminal of the current mirror trunk 2311 and grounded; and the gate G of the NMOS0 is connected with the drain D of the NMOS0 and pulled high so that the gate-source difference in voltage VGS between the gate G and the source S is at a positive value and higher than the cutoff voltage of the NMOS0, that is, the NMOS0 is normally-on, so the nominal current reference Iref_s received at the input terminal of the current mirror trunk 2311 from the input terminal of the current adjustment module 231 can be output at the output terminal of the current mirror trunk 2311.

The input terminals of the m current mirror branches 2312-1 to 2312-m are aggregated at the output terminal of the current mirror trunk 2311 to receive 1/m of the nominal current reference Iref_s, i.e., the size of an adjustment shift; and the output terminals of the m current mirror branches 2312-1 to 2312-m are aggregated at the output terminal of the current adjustment module 231 to output the variable current reference Iref_g. Moreover each current mirror branch 2312-i (where i represents a positive integer higher than or equal to 1 and lower than or equal to m) includes three NMOSi0 to NMOSi2 and an inverter Revi, where:

The source S of the NMOSi0 is the input terminal of the current mirror branch 2312-i, and the drain D thereof is the output terminal of the current mirror branch 2312-i;

The source S of the NMOSi1 is connected with the gate G of the NMOSi0, the drain D thereof is connected with the drain D of the NMOSi0 (pulled high), and the gate G thereof is connected with the i-th bit output terminal of the decoder 2313; and The source S of the NMOSi2 is connected with the source S of the NMOS0 (grounded), the drain D thereof is connected with the gate G of the NMOSi0, and the gate G thereof is connected with the i-th bit output terminal of the decoder 2313 through the inverter Revi.

The decoder 2313 receives a current encoded signal Icode at the input terminal thereof from the detection control module 230 over a current control bus and controls level statues of the m output terminals thereof by the current encoded signal Icode.

When the i-th bit output terminal of the decoder 2313 is at a high level 1, the gate G of the NMOSi1 is pulled high to turn on the NMOSi1, and the gate G of the NMOSi2 is inverted by the inverter Revi and then pulled low to turn off the NMOSi2; and the turned-on NMOSi1 will further result in conductivity between the gate G of the NMOSi0 with the gate G of the NMOS0 so that a current mirror with a proportion of 1/m to the current mirror trunk 2311 is formed at the current mirror branch 2312-i, and consequently 1/m of the nominal current reference Iref_s is aggregated at the output terminal of the current adjustment module 231 through the output terminal of the current mirror branch 2312-i.

When the i-th bit output terminal of the decoder 2313 is at a high level 0, the gate G of the NMOSi2 is pulled low to turn off the NMOSi1, and the gate G of the NMOSi2 is inverted by the inverter Revi and then pulled high to turn on the NMOSi2; and the turned-on NMOSi2 will further pull low the gate of the NMOSi0 to turn off NMOSi0 so that 1/m of the nominal current reference Iref_s received at the input terminal of the current mirror branch 2312-i will not be aggregated at the output terminal of the current adjustment module 231.

As can be apparent from the description above, when all the m bit output terminals of the decoder 2313 are at a high level 1, 1/m of the nominal current reference Iref_s of each current mirror branch 2312-i can be aggregated at the output terminal of the current adjustment module 231, and correspondingly the variable current reference Iref_g generated at the output terminal of the current adjustment module 231 is equal to the nominal current reference Iref_s, i.e., the highest current value.

When all the m bit output terminals of the decoder 2313 are not at 1, at least 1/m of the nominal current reference Iref_s can not be aggregated at the output terminal of the current adjustment module 231, and correspondingly the variable current reference Iref_g generated at the output terminal of the current adjustment module 231 is lower than the nominal current reference Iref_s. Then as described above for the function of the lowest current value of the variable current reference Iref_g, one of these current values 0 to (m-1) Iref_s/m lower than the nominal current reference Iref_s can be selected as the lowest current value as needed.

Of course the current adjustment module 231 can alternatively be embodied in another structure, e.g., a rheostat-based structure, so a repeated description thereof will be omitted here. Correspondingly the current adjustment module 231 can alternatively be controlled in another form of signal than the current encoded signal Icode.

Figure 4:
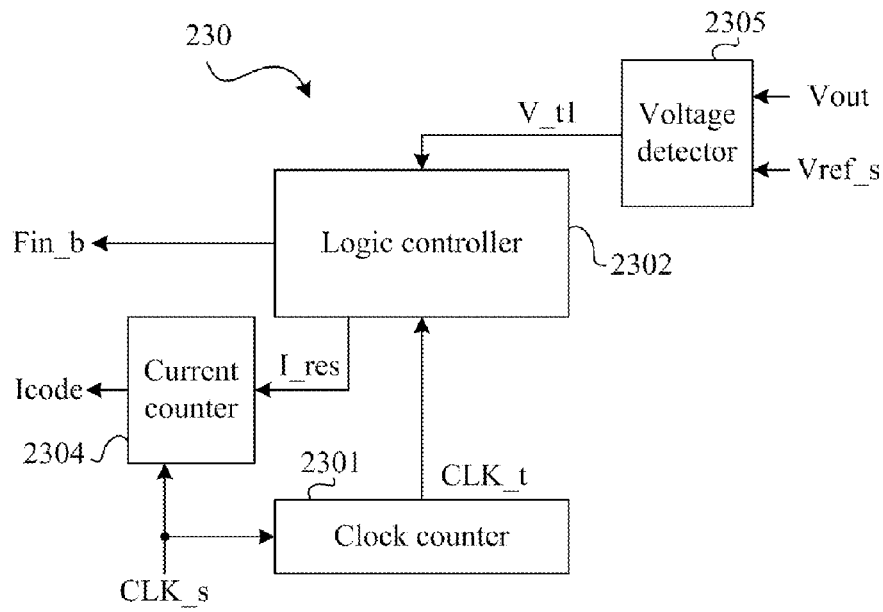
FIG. 4 is a schematic structural diagram of a preferred detection control module included in the charging control circuit in the charging apparatus based on the first embodiment of the invention.

FIG. 4 is a schematic structural diagram of a preferred detection control module included in the charging control circuit in the charging apparatus based on the first embodiment of the invention. As illustrated in FIG. 4, the detection control module includes a clock counter 2301, a logic controller 2302, a current counter 2304 and a voltage detector 2305.

The clock counter 2301 is configured to count the reference clock signal CLK_s and to generate an interruption clock signal CLK_t from a result of counting, where the active interruption clock signal CLK_t indicates the period of interruption, and the inactive interruption clock signal CLK_t indicates the period of charging.

Correspondingly the logic controller 2302 is configured to generate a current reset signal I_res from the interruption clock signal CLK_t, where the current reset signal I_res is set active at the active interruption clock signal CLK_t.

The current counter 2304 is configured to perform a counting operation based on the reference clock signal and the current reset signal I_res and to output a result of current counting to the current adjustment module 231 for adjustment by the current adjustment module 231 based on the result of current counting (with the current adjustment module 231 in the preferred structure as illustrated in FIG. 3, the result of current counting can be output to the current adjustment module 231 in the form of the current encoded signal Icode for reception at the input terminal of the decoder 2313);

Where each time the reference clock signal CLK_s jumps from being inactive to an arriving active clock edge (at the end of the period of interruption):

If the current reset signal I_res is active, then a counting operation to reset the result of current counting to the lowest current counting value is performed once, where the lowest current counting value corresponds the lowest current value of the variable current reference Iref_g; and If the current reset signal I_res is inactive, then a counting operation to increase the result of current counting by a current adjustment step size is performed once until the highest current counting value or a preset default current counting value is reached, where the highest current counting value corresponds to the highest current value of the variable current reference Iref_g (i.e., the nominal current reference Iref_s), and the default current counting value corresponds to the pre-selected default current value mentioned above, that is, in order that "the limitation above of the variable current reference Iref_g is removed", this is performed by the current counter 2304 through constantly counting to adjust rapidly the variable current reference Iref_g to the highest current value and maintaining it stably at the highest current value for the period of charging or through adjusting the variable current reference Iref_g to a pre-selected default current value higher than the lowest current value and lower than or equal to the highest current value and maintaining it stably at the default current value for the period of charging.

The voltage detector 2305 is configured to detect the magnitude of a voltage difference by which the output voltage Vout is lower than the nominal voltage reference Vref_s and to generate a voltage detection signal V_t1 based on the magnitude of the voltage difference, where the voltage detection signal V_t1 is active when the voltage difference is lower than the voltage threshold Th_v1, that is, the active voltage detection signal V_t1 indicates that the output voltage Vout has nearly reached the nominal voltage reference Vref_s.

Correspondingly the logic controller 2302 is further configured to generate the charging termination signal Fin_b from the interruption clock signal CLK_t and the voltage detection signal V_t1, where when the interruption clock signal CLK_t jumps from being active to an arriving inactive clock edge, if the voltage detection signal V_t1 is active (which approximately indicates at the end of the period of interruption that the kernel voltage V0 of the battery 100 has nearly reached the nominal voltage reference Vref_s), then the charging termination signal Fin_b is set active.

The detection control module 230 can perform its corresponding function in the preferred structure above, where the clock counter 2301 and the current counter 2304 essentially perform the function of a counter well known to those skilled in the art, so a repeated description of implementations of the clock counter 2301 and the current counter 2304 will be omitted here; and although a number of implementations of the voltage detector 2305 and the logic controller 2302 can be embodied by those skilled in the art in combinations of various elements, they will be further described below respectively by way of an example.

The voltage detector 2305 detecting the magnitude of a voltage difference by which the output voltage Vout is lower than the nominal voltage reference Vref_s substantially detects the closeness of the output voltage Vout to the nominal voltage reference Vref_s. Then in a particular implementation, firstly the particular voltage value of the voltage difference can be detected and then the particular voltage value of the voltage difference can be compared with the voltage threshold Th_v1, or firstly a voltage difference equivalent to a loss by the voltage threshold Th_v1 can be extracted from the nominal voltage reference Vref_s and then the output voltage Vout can be compared with the extracted voltage difference.

Figure 5:
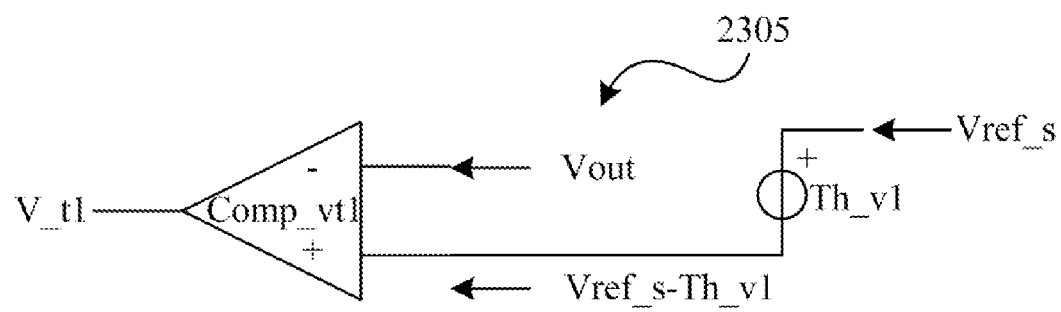
FIG. 5 is a schematic diagram of a particular example of a voltage detector in the detection control module illustrated in FIG. 4.

FIG. 5 is a schematic diagram of a particular example of the voltage detector in the detection control module illustrated in FIG. 4. Firstly a voltage difference equivalent to a loss by the voltage threshold Th_v1 can be extracted from the nominal voltage reference Vref_s and then the output voltage Vout can be compared with the voltage difference in FIG. 5.

As illustrated in FIG. 5, the voltage detector 2305 includes a comparator Comp_vt1, where the negative input terminal of the comparator Comp_vtl receives the output voltage Vout, the other positive input terminal of the comparator Comp_vtl receives the voltage difference Vref_s-Th_v1 between the nominal voltage reference Vref_s and the voltage threshold Th_v1, and the output terminal of the comparator Comp_vtl generates the voltage detection signal V_t1, where:

When the output voltage Vout is lower than or equal to the voltage difference Vref_s-Th_v1, this indicates that a voltage difference by which the output voltage Vout is lower than the nominal voltage reference Vref_s is higher than or equal to the voltage threshold Th_v1 (the output voltage Vout has not nearly reached the nominal voltage reference Vref_s), so the voltage detection signal V_t1 at this time is inactive at a high level; and When the output voltage Vout is higher than the voltage difference Vref_s-Th_v1, this indicates that a voltage difference by which the output voltage Vout is lower than the nominal voltage reference Vref_s is lower than to the voltage threshold Th_v1 (the output voltage Vout has nearly reached the nominal voltage reference Vref_s), so the voltage detection signal V_t1 at this time is active at a low level.

The logic controller 2302 generally performs a logic judgment and trigger function.

Figure 6:
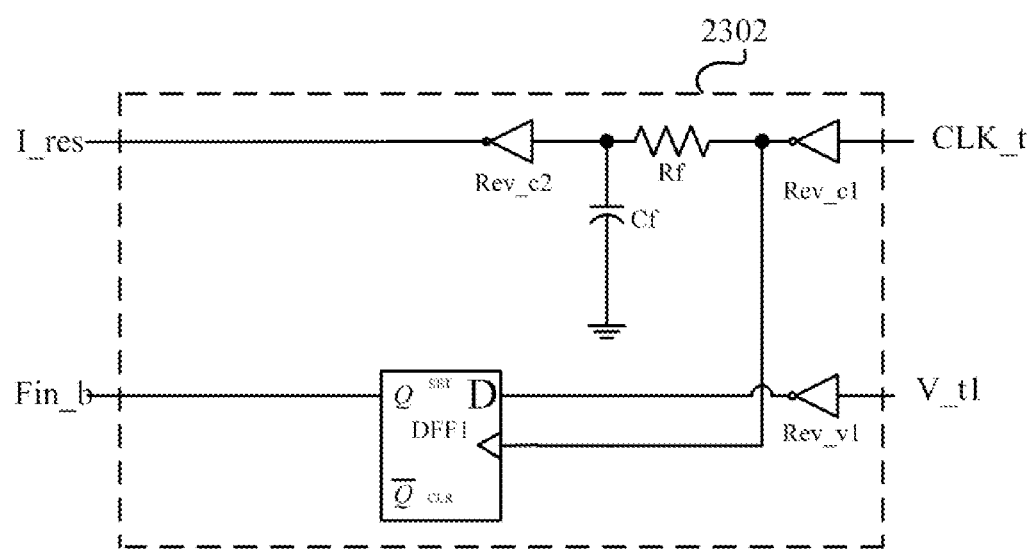
FIG. 6 is a schematic diagram of a particular example of a logic controller in the detection control module illustrated in FIG. 4.

FIG. 6 is a schematic diagram of a particular example of the logic controller in the detection control module illustrated in FIG. 4. A logic judgment and trigger scheme easy to implement is adopted in FIG. 6. As illustrated in FIG. 6, the logic controller 2302 includes inverters Rev_c1 and Rev_c2, a resistor Rf, a capacitor Cf, a D flip-flop DFF1 and an inverter Rev_v1.

The reference clock signal CLK_t is inverted by the inverter Rev_c1, delayed by a delay circuit consisted of the resistor Rf and the capacitor Cf and inverted by the inverter Rev_c2 in that order to generate the current reset signal I_res so that when the reference clock signal CLK_t is active at a high level indicating a period of interruption, the current reset signal I_res is set active at a high level and slightly delayed from the reference clock signal CLK_t, and when the reference clock signal CLK_t is inactive at a low level indicating the period of charging, the current reset signal I_res is set inactive at a low level and slightly delayed from the reference clock signal CLK_t.

The D flip-flop DFF1 is controlled by the reference clock signal CLK_t inverted by the inverter Rev_c1 and triggers inversion of the level status of the charging termination signal Fin_b based on the level status of the voltage detection signal V_t1 inverted by the inverter Rev_v1 so that the charging termination signal Fin_b is inverted from being inactive at a low level to being active at a high level based on the active voltage detection signal V_t1 at a low level at the rising edge of the inverted reference clock signal CLK_t, that is, when the reference clock signal CLK_t jumps from being active at a high level to an arriving falling edge inactive at a low level (at the end of the period of interruption).

Second Apparatus Embodiment

Figure 7:
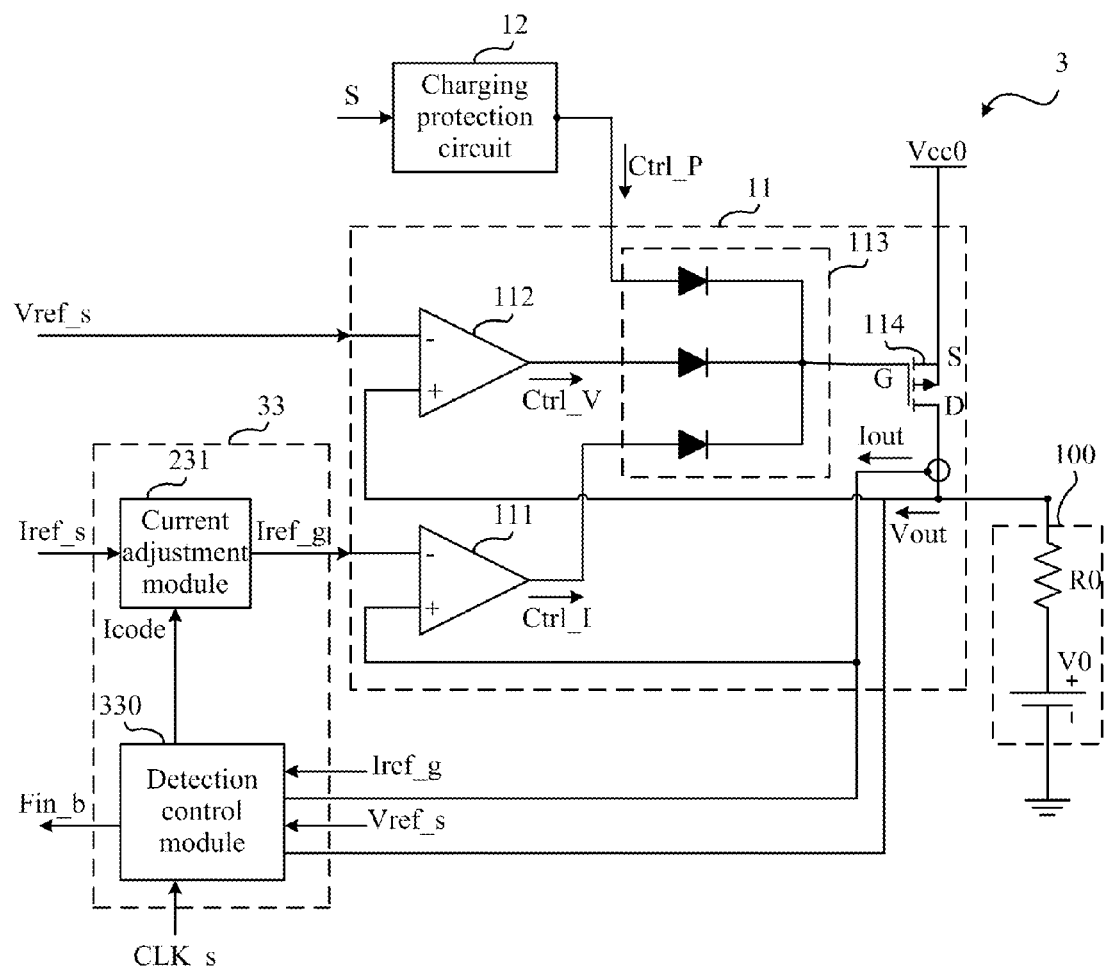
FIG. 7 is a schematic structural diagram of an example of a charging apparatus based on a second embodiment of the invention.

FIG. 7 is a schematic structural diagram of an example of a charging apparatus based on a second embodiment of the invention. As illustrated in FIG. 7, the charging apparatus 3 configured to charge a battery 100 includes a charging execution circuit 11, a charging protection circuit 12 and a charging control circuit 33.

Where the structures and operation principles of the charging execution circuit 11 and the charging protection circuit 12 are the same as those in the prior art, so a repeated description thereof will be omitted here, and the charging protection circuit 12 is optional instead of being necessary; and the charging control circuit 33 is configured to control the charging execution circuit 11 to adjust output voltage Vout and output current Iout generated at a charging output terminal thereof and to control charging by the charging execution circuit 11 to be terminated.

Particularly the charging control circuit 33 in the charging apparatus 3 in the present embodiment includes the current adjustment module 231 and a detection control module 330.

The function and the particular implementation of the current adjustment module 231 have been described in the first apparatus embodiment (where m shall be higher than 1 when the current adjustment module 231 is embodied in the structure as illustrated in FIG. 3), so a repeated description thereof will be omitted in the present embodiment; and The detection control module 330 is configured to trigger periodically interruption of charging, to control the current adjustment module 231 and to generate a charging termination signal Fin_b, where the variable current reference Iref_g is limited at the lowest current value above by controlling the current adjustment module 231 in a period of interruption, and the limitation above of the variable current reference Iref_g is removed by controlling the current adjustment module 231 in the period of charging spaced by periods of interruption; and when the output voltage Vout lower than an externally input nominal voltage reference Vref_s by a voltage difference lower than the preset voltage threshold Th_v1 (which approximately indicates that the kernel voltage V0 of the battery 100 has nearly reached the nominal voltage reference Vref_s) is detected at the end of the period of interruption, to set the charging termination signal Fin_b active to trigger termination of charging; and Moreover the variable current reference Iref_g with the limitation thereof above being removed has the following several varying status dependent upon the control of the current adjustment module 231 by the detection control module 330:

When the output current Iout lower than the variable current reference Iref_g by a current difference lower than a preset current threshold Th_i1 (which indicates that the output current Iout has been very close to the current variable current reference Iref_g) is detected in the period of charging, if the variable current reference Iref_g has not reached the highest current value thereof (i.e., the nominal current reference Iref_s), then the variable current reference Iref_g is adjusted up by the current adjustment module 231;

When the output current Iout lower than the variable current reference Iref_g by a current difference higher than or equal to a preset current threshold Th_i2 and lower than a preset current threshold Th_i3 (which indicates that the output current Iout has been significantly lower than the current variable current reference Iref_g) is detected in the period of charging, if the variable current reference Iref_g has not reached the lowest current value above, then the variable current reference Iref_g is adjusted down by the current adjustment module 231; and When the output current Iout lower than the variable current reference Iref_g by a current difference higher than or equal to the preset current threshold Th_i3 (which indicates that the output current Iout has been far lower than the current variable current reference Iref_g) is detected in the period of charging, if the variable current reference Iref_g has not reached the lowest current value above, then the variable current reference Iref_g is reset to the lowest current value above by the current adjustment module 231; and Where the current threshold Th_i1 is lower than the current threshold Th_i2, and the current threshold Th_i2 is lower than the current threshold Th_i3.

With the charging control circuit 33 above, the current reference input terminal of the charging execution circuit 11 receives the variable current reference Iref_g instead of the constant nominal current reference Iref_s; and moreover in the present embodiment, the voltage reference input terminal of the charging execution circuit 11 (i.e., the negative input terminal of the differential amplifier 112) still receives the input nominal voltage reference Vref_s.

Then since the variable current reference Iref_g will be limited to the lowest current value above in each period of interruption, the drawback of insufficient charging can be alleviated in the present embodiment as in the first apparatus embodiment.

Moreover the variable current reference Iref_g can be adjusted adaptively to the varying output current Iout in the period of charging in the present embodiment, that is, the present embodiment can be implemented simply by adjusting the variable current reference Iref_g adaptively so that "the limitation above of the variable current reference Iref_g is removed" as described in the first embodiment. With this adaptive adjustment scheme:

When the output current Iout has been very close to the current variable current reference Iref_g, the higher output current Iout is allowed by raising the variable current reference Iref_g;

When the output current Iout has been significantly lower than the current variable current reference Iref_g, the lower output current Iout is accommodated by lowering the variable current reference Iref_g to thereby avoid an instantaneous up-rush of the rebounding output current Iout; and When the output current Iout has been far lower than the current variable current reference Iref_g, the instantaneously suddenly dropped output current Iout upon sudden fluctuation is accommodated by resetting the variable current reference Iref_g to the lowest current value above to thereby avoid an instantaneous up-rush of the rebounding output current Iout with an instantaneous sudden raise due to sudden fluctuation.

As can be apparent from the description above, an instantaneous up-rush of the output current Iout can be further refrained by adjusting the variable current reference Iref_g in the period of charging in the present embodiment as compared with the first apparatus embodiment.

Further preferably the detection control module 330 can be further configured to have the variable current reference Iref_g reset to the lowest current value above by controlling the current adjustment module 231 when the charging termination signal Fin_b is set active to thereby avoid an instantaneous up-rush of the output current Iout at the beginning of the next time of charging.

It shall be noted that although the voltage reference input terminal of the charging execution circuit 11 (i.e., the negative input terminal of the differential amplifier 112) receives the nominal voltage reference Vref_s in the present embodiment, those skilled in the art can appreciate from the following description of a fourth apparatus embodiment that there will be no substantial influence upon the refraining of an instantaneous up-rush no matter whether the nominal voltage reference Vref_s is input at the voltage reference input terminal of the charging execution circuit 11.

Since the function and the particular implementation of the current adjustment module 231 have been described in the first apparatus embodiment, only the detection control module 330 included in the charging control circuit 23 in the charging apparatus 3 based on the present embodiment will be described below in details.

Figure 8:
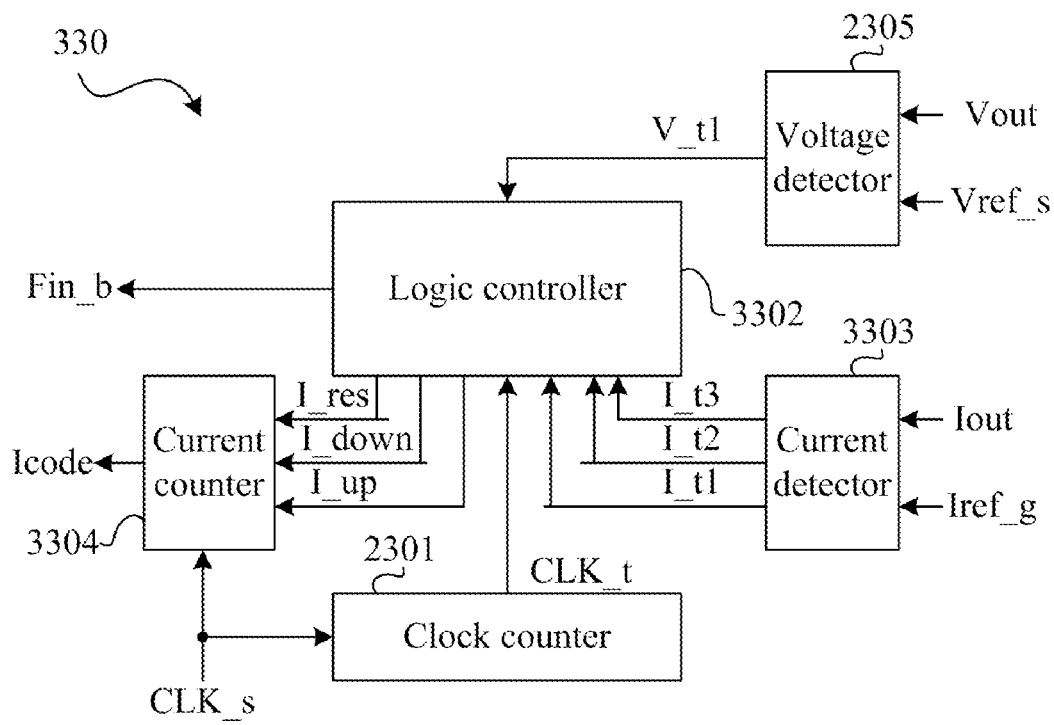
FIG. 8 is a schematic structural diagram of a preferred detection control module included in a charging control circuit in the charging apparatus based on the second embodiment of the invention.

FIG. 8 is a schematic structural diagram of a preferred detection control module included in the charging control circuit in the charging apparatus based on the second embodiment of the invention. As illustrated in FIG. 8, the detection control module 330 includes the clock counter 2301, a logic controller 3302, a current detector 3303, a current counter 3304 and the voltage detector 2305.

The clock counter 2301 has been described in the first apparatus embodiment, so a repeated description thereof will be omitted in the present embodiment. Correspondingly the logic controller 3302 periodically triggers interruption of charging based on the interruption clock signal CLK_t generated by the clock counter 2301 in the same way as the logic controller 2302 in the first apparatus embodiment, so a repeated description thereof will also be omitted in the present embodiment.

The current detector 3303 is configured to detect the magnitude of a current difference by which the output current Iout is lower than the variable current reference Iref_g and to generate a current detection signal I_t1, a current detection signal I_t2 and a current detection signal I_t3 based on the magnitude of the current difference, where the current detection signal I_t1 is active when the current difference above is lower than the current threshold Th_i1, the current detection signal I_t2 is active when the current difference above is lower than the current threshold Th_i2, and the current detection signal I_t3 is active when the current difference above is lower than the current threshold Th_i3. Definitions of various combinations of levels of the current detection signal I_t1, the current detection signal I_t2 and the current detection signal I_t3 are listed in Table 1 as presented below.

TABLE 1

| I_t1 | I_t2 | I_t3 | Range including ΔI | Definition |
| --- | --- | --- | --- | --- |
| Active | Active | Active | ΔI < Th_i1 | Iout very close Iref_g |
| Inactive | Active | Active | Th_i1 ≤ ΔI < Th_i2 | Appropriate difference of Iout from Iref_g |
| Inactive | Inactive | Active | Th_i2 ≤ ΔI < Th_i3 | Iout significantly lower than Iref_g |
| Inactive | Inactive | Inactive | Th_i3 < ΔI | Iout far lower than Iref_g |

In Table 1, ΔI represents a current difference by which the output current Iout is lower than the variable current reference Iref_g.

Correspondingly the logic controller 2302 is configured to generate a current-up signal I_up, a current-down signal I_down and a current reset signal I_res based on the interruption clock signal CLK_t generated by the clock counter 2301 and the current detection signals I_t1 to I_t3 generated by the current detector 3303, where with the definitions of the various combinations of levels depicted in Table 1, the current-up signal I_up, the current-down signal I_down and the current reset signal I_res generated by the logic controller 2302 vary in level as follow:

When the interruption clock signal CLK_t is inactive (in the period of charging), if the current detection signal I_t1 is active (which indicates that the output current Iout has been very close to the current variable current reference Iref_g), then the current-up signal I_up is set active; otherwise, the current-up signal I_up is maintained inactive;

When the interruption clock signal CLK_t is inactive, if the current detection signal I_t2 is inactive and the current detection signal I_t3 is active (which indicates that the output current Iout has been significantly lower than the current variable current reference Iref_g), then the current-up signal I_down is set active; otherwise, the current-up signal I_down is maintained inactive;

When the interruption clock signal CLK_t is inactive, if the current detection signal I_t3 is inactive (which indicates that the output current Iout has been far lower than the current variable current reference Iref_g), then the current reset signal I_res is set active; and when the interruption clock signal CLK_t is active (the period of interruption is entered), the current reset signal I_res is set active; and When the current detection signal I_t3 is inactive and a delayed reference clock signal CLK_t' is inactive (which indicates the period of charging), the current reset signal I_res is set inactive.

The current counter 3304 is configured to perform a counting operation based on the reference clock signal CLK_s, the current-up signal I_up, the current-down signal I_down and the current reset signal I_res and to output a result of current counting to the current adjustment module 231 for adjustment by the current adjustment module 231 based on the result of current counting (with the current adjustment module 231 in the preferred structure as illustrated in FIG. 3, the result of current counting can be output to the current adjustment module 231 in the form of a current encoded signal Icode for reception at the input terminal of the decoder 2313), where each time the reference clock signal CLK_s jumps from being inactive to an arriving active clock edge:

If the current-up signal I_up is active, then a counting operation to increase the result of current counting by a current adjustment step size is performed once (with the current adjustment module 231 in the preferred structure as illustrated in FIG. 3, the respective current adjustment step sizes can be set uniformly, that is, the numbers of adjustment shifts corresponding to the respective current adjustment step sizes can be set uniformly; or of course the current adjustment step sizes may not be set uniformly, that is, each current adjustment step size can be set by increasing or decreasing a preceding or succeeding current adjustment step size by at least one adjustment shift);

If the current-down signal I_down is active, then a counting operation to decrease the result of current counting by a current adjustment step size is performed once; and If the current reset signal I_res is active, then a counting operation to reset the result of current counting to the lowest current counting value is performed once, where the lowest current counting value corresponds to the lowest current value above.

The voltage detector 2305 has been described in the first apparatus embodiment, so a repeated description thereof will be omitted in the present embodiment. Correspondingly the logic controller 3302 generates the charging termination signal Fin_b based on the interruption clock signal CLK_t generated by the clock counter 2301 and the voltage detection signal V_t1 generated by the voltage detector 2305 in the same way as the logic controller 2302 in the first apparatus embodiment, so a repeated description thereof will also be omitted in the present embodiment.

Moreover if it is necessary for the detection control module 330 to further have the variable current reference Iref_g reset to the lowest current value above by controlling the current adjustment module 231 when the charging termination signal Fin_b is set active, then the logic controller 3302 can further reset the current reset signal I_res active when the charging termination signal Fin_b is active. In this case, the current reset signal I_res is set inactive at a low level when the current detection signal I_t3 is inactive, the charging termination signal Fin_b is inactive and the delayed reference clock signal CLK_t' is inactive indicating the period of charging.

The detection control module 330 can perform its corresponding function in the preferred structure above, where the current counter 3304 essentially perform the function of a counter well known to those skilled in the art, so a repeated description of an implementation of the current counter 3304 will be omitted here; and although a number of implementations of the current detector 3303 and the logic controller 3302 can be embodied by those skilled in the art in combinations of various elements, they will be further described below respectively by way of an example.

The current counter 3304 detecting the magnitude of a current difference by which the output current Iout is lower than the variable current reference Iref_g substantially detects the closeness of the output current Iout to the variable current reference Iref_g. Then in a particular implementation, firstly the particular current value of the current difference can be detected and then the particular current value of the current difference can be compared respectively with the current thresholds Th_i1 to TH_i3, or firstly voltage differences equivalent respectively to losses by the current thresholds Th_i1 to TH_i3 can be extracted from the current variable current reference Iref_g and then the output current Iout can be compared respectively with the respective extracted current differences.

The current can be converted into corresponding voltage for comparison for the sake of an easier implementation of whichever detection scheme above in use.

Figure 9:
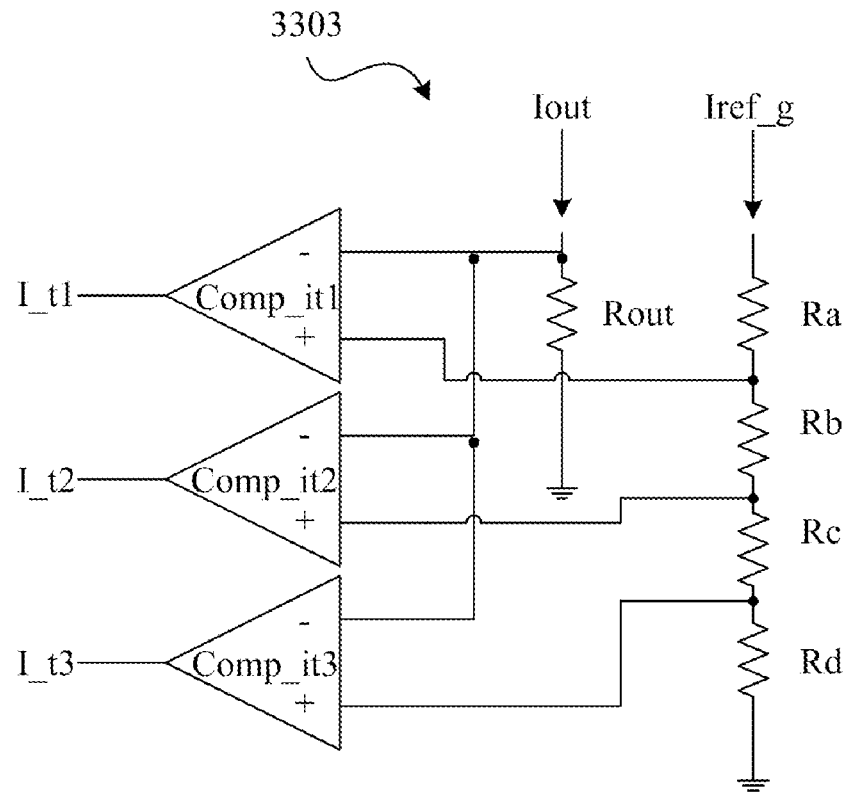
FIG. 9 is a schematic diagram of a particular example of a current detector in the detection control module illustrated in FIG. 8.

FIG. 9 is a schematic diagram of a particular example of the current detector in the detection control module illustrated in FIG. 8. Firstly voltage differences equivalent respectively to losses by the current thresholds Th_i1 to TH_i3 can be extracted from the current variable current reference Iref_g and then the output current Iout can be compared respectively with the respective extracted current differences by converting the output current Iout and the respective current differences into corresponding voltage for comparison in FIG. 9.

As illustrated in FIG. 9, the current counter 3304 includes resistors Ra, Rb, Rc, Rd and Rout and also comparators Comp_it1 to Comp_it3.

The resistors Ra, Rb, Rc and Rd are connected in series into a string of resistors, where the terminal of the string of resistors at the resistor Ra side receives the variable current reference Iref_g, and the other terminal thereof at the resistor Rd is grounded. Correspondingly the terminal of the string of resistors at the resistor Ra side can generate voltage corresponding in magnitude to the variable current reference Iref_g; and there are increasing voltage drops across the connected terminals of the resistors Ra and Rb, the connected terminals of the resistors Rb and Rc and the connected terminals of the resistors Rc and Rd in that order, and the increasing voltage drops correspond in magnitude respectively to the current thresholds Th_i1 to Th_i3. Then the voltages across the connected terminals of the resistors Ra and Rb, the connected terminals of the resistors Rb and Rc and the connected terminals of the resistors Rc and Rd correspond in magnitude respectively to the current differences in the variable current reference Iref_g equivalent to losses by the current thresholds Th_i1 to Th_i3.

One terminal of the resistor Rout receives the output current Iout, and the other terminal thereof is grounded. Correspondingly the terminal of the resistor Rout at which the output current Iout is received can generate voltage corresponding in magnitude to the output current Iout.

As such the voltage at the terminal of the resistor Rout at which the output current Iout is received is compared respectively with the voltages across the connected terminals of the resistors Ra and Rb, the connected terminals of the resistors Rb and Rc and the connected terminals of the resistors Rc and Rd to thereby derive the relationships in magnitude between a current difference by which the output current Iout is lower than the variable current reference Iref_g and the current thresholds Th_i1 to Th_i3. Thus:

The negative input terminal of the comparator Comp_it1 is connected with the terminal of the Rout at which the output voltage Vout is received, and the other positive input terminal thereof is connected with the connected terminals of the Ra and the Rb, and the output terminal of the comparator Comp_it1 generates the current detection signal I_t1, where when the voltage at the terminal of the Rout at which the output voltage Vout is received is lower than or equal to the voltage at the connected terminals of the Ra and the Rb, this indicates that a current difference by which the output current Iout is lower than the variable current reference Iref_g is higher than or equal to the current threshold Th_i1, so the current detection signal I_t1 at this time is inactive at a high level; and when the voltage at the terminal of the Rout at which the output voltage Vout is received is higher than the voltage at the connected terminals of the Ra and the Rb, this indicates that a current difference by which the output current Iout is lower than the variable current reference Iref_g is lower than the current threshold Th_i1, so the current detection signal I_t1 at this time is inactive at a high level;

The negative input terminal of the comparator Comp_it2 is connected with the terminal of the Rout at which the output voltage Vout is received, and the other positive input terminal thereof is connected with the connected terminals of the Rb and the Rc, and the output terminal of the comparator Comp_it2 generates the current detection signal I_t2 under the same principle as the comparator Comp_it1; and The negative input terminal of the comparator Comp_it3 is connected with the terminal of the Rout at which the output voltage Vout is received, and the other positive input terminal thereof is connected with the connected terminals of the Rc and the Rd, and the output terminal of the comparator Comp_it3 generates the current detection signal I_t3 under the same principle as the comparator Comp_it1.

The logic controller 3302 generally performs a logic judgment and trigger function.

Figure 10:
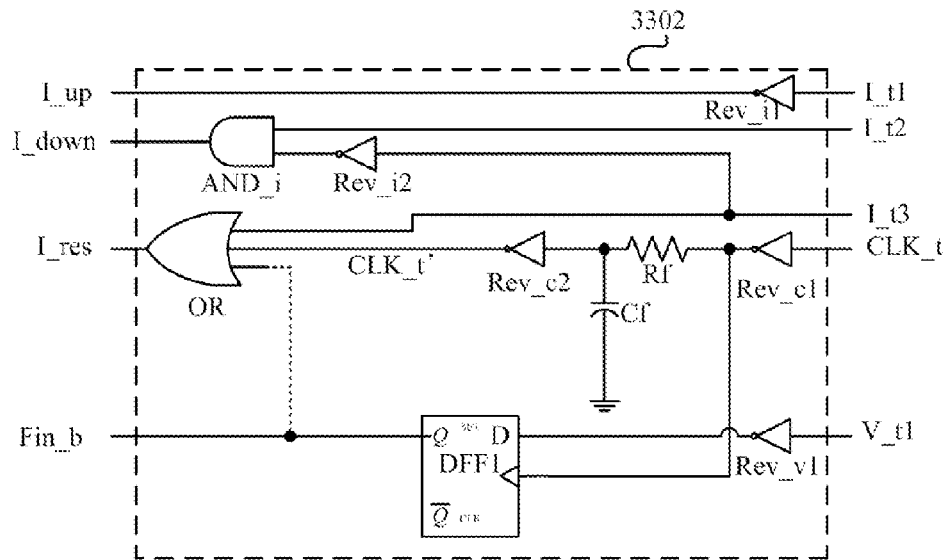
FIG. 10 is a schematic diagram of a particular example of a logic controller in the detection control module illustrated in FIG. 8.

FIG. 10 is a schematic diagram of a particular example of the logic controller in the detection control module illustrated in FIG. 8. A logic judgment and trigger scheme easy to implement is adopted in FIG. 10. As illustrated in FIG. 10, the logic controller 2302 includes inverters Rev_i1 and Rev_i2, an AND gate ANDi and an OR gate OR and also Rev_c1 and Rev_c2, a resistor Rf, a capacitor Cf, a D flip-flop DFF1 and an inverter Rev_v1.

The current detection signal I_t1 is inverted by the inverter Rev_i1 to thereby generate the current-up signal I_up; and if the current detection signal I_t1 is active at a low level, then the current-up signal I_up becomes active at a high level; otherwise, the current-up signal I_up becomes inactive at a low level.

The current detection signal I_t2 is input to the AND gate ANDi, and the current detection signal I_t3 is inverted by the inverter Rev_i2 and also input to the AND gate ANDi; and when the current detection signal I_t2 is inactive at a high level and the current detection signal I_t3 is active at a low level, the current-down signal I_down output by the AND gate ANDi becomes active at a high level; otherwise, the current-down signal I_down output by the AND gate ANDi becomes inactive at a low level.

The current detection signal I_t3 is output to the OR gate OR; and when the current detection signal I_t3 is inactive at a high level, the current rest signal I_res output by the OR gate OR becomes active at a high level.

The reference clock signal CLK_t is inverted by the inverter Rev_c1, delayed by a delay circuit consisted of the resistor Rf and the capacitor Cf and inverted by the inverter Rev_c2 in that order and then delayed to generate the reference clock signal CLK_t' output to the OR gate OR, and when the delayed reference clock signal CLK_t' is active at a high level indicating a period of interruption, the current reset signal I_res output by the OR gate OR becomes active at a high level.

The D flip-flop DFF1 is controlled by the reference clock signal CLK_t inverted by the inverter Rev_c1 and triggers inversion of the level status of the charging termination signal Fin_b based on the level status of the voltage detection signal V_t1 inverted by the inverter Rev_v1 so that the charging termination signal Fin_b is inverted from being inactive at a low level to being active at a high level based on the active voltage detection signal V_t1 at a low level at the rising edge of the inverted reference clock signal CLK_t, that is, when the reference clock signal CLK_t jumps from being active at a high level to an arriving falling edge inactive at a low level (at the end of the period of interruption).

In a practical application, if it is necessary for the detection control module 330 to further have the variable current reference Iref_g reset to the lowest current value above by controlling the current adjustment module 231 when the charging termination signal Fin_b is set active, then the charging termination signal Fin_b is output to the OR gate OR (represented by a dotted line in FIG. 10) in addition to the charging control circuit 33; and when the charging termination signal Fin_b is active at a high level, the current reset signal I_res output by the OR gate becomes active at a high level.

Figure 11:
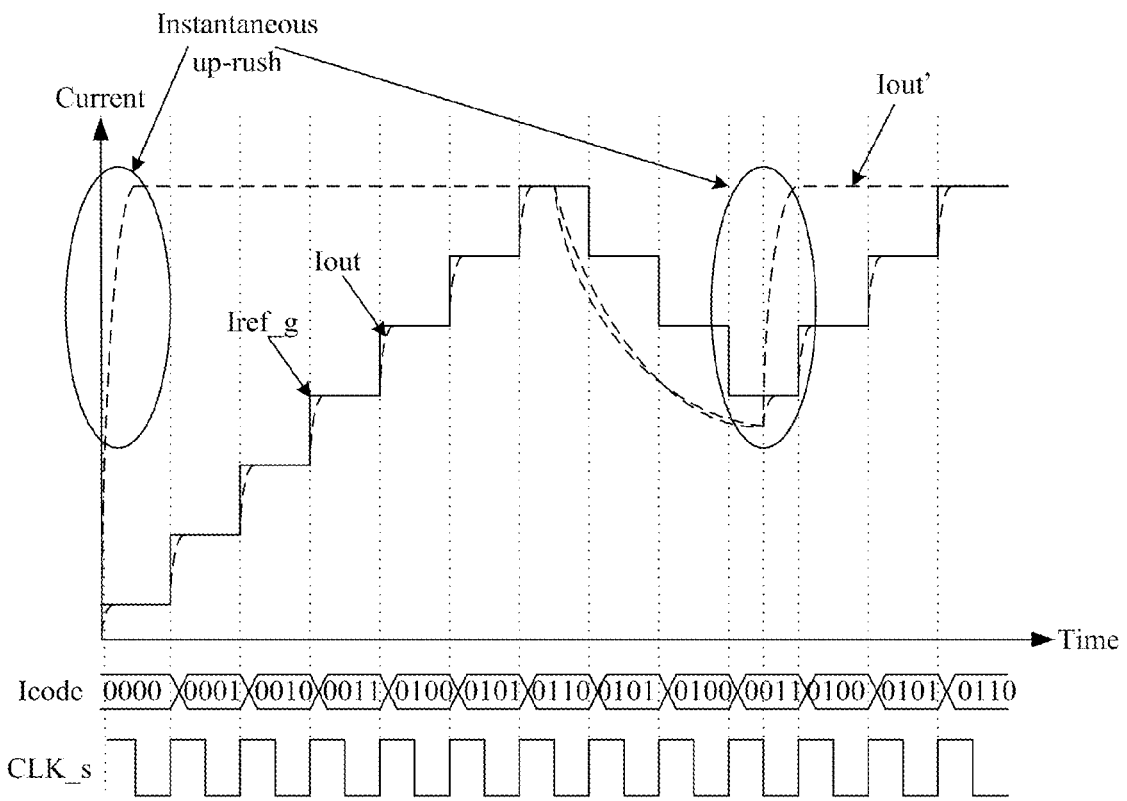
FIG. 11 is a schematic waveform diagram of output current generated by the charging apparatus based on the second embodiment of the invention.

FIG. 11 is a schematic waveform diagram of output current generated by the charging apparatus based on the second embodiment of the invention. FIG. 11 illustrates a waveform of output current Iout in a period of charging using the solution of the present embodiment and a waveform of output current Iout' without using the solution of the present embodiment; and the current adjustment module 231 in the structure as illustrated in FIG. 3 with m=16 is used in the solution of the present embodiment in FIG. 11 by way of an example.

Referring to FIG. 11, the result of current counting represented by the current encoded signal Icode will gradually increase with the raising output current Iout or gradually increase with the dropping output current Iout at the frequency of the reference clock signal CLK_t in the period of charging using the solution of the present embodiment to thereby avoid an instantaneous up-rush of the output current Iout.

Further referring to FIG. 11, there will easily occur significant fluctuation and consequentially an instantaneous up-rush of the output current Iout' in the period of charging without using the solution of the present embodiment.

Then as can be apparent more intuitively from FIG. 11, an instantaneous up-rush of the output current Iout can be prevented effectively by adjusting the variable current reference Iref_g adaptively as in the present embodiment.

Third Apparatus Embodiment

Figure 12:
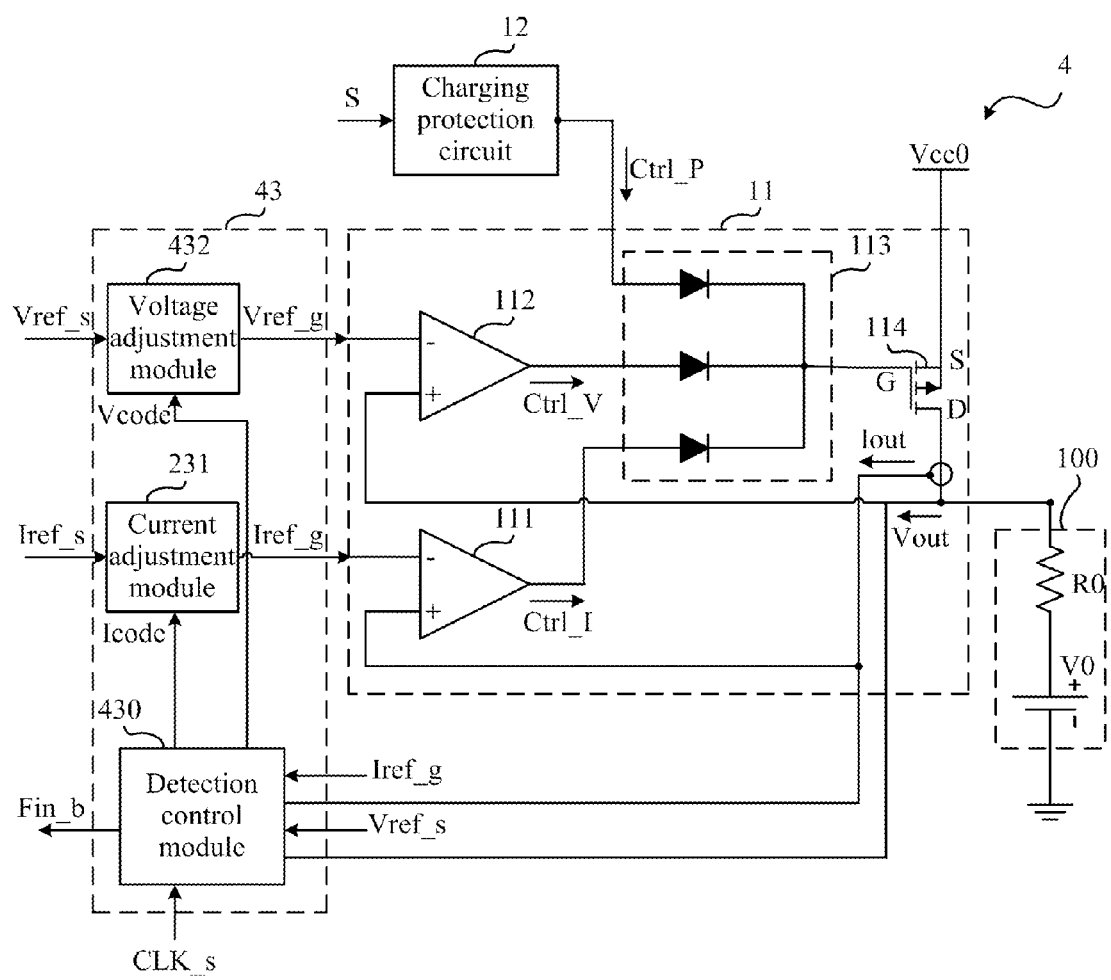
FIG. 12 is a schematic structural diagram of an example of a charging apparatus based on a third embodiment of the invention.

FIG. 12 is a schematic structural diagram of an example of a charging apparatus based on a third embodiment of the invention. As illustrated in FIG. 12, the charging apparatus 4 configured to charge a battery 100 includes a charging execution circuit 11, a charging protection circuit 12 and a charging control circuit 43.

Where the structures and operation principles of the charging execution circuit 11 and the charging protection circuit 12 are the same as those in the prior art, so a repeated description thereof will be omitted here, and the charging protection circuit 12 is optional instead of being necessary; and the charging control circuit 43 is configured to control the charging execution circuit 11 to adjust output voltage Vout and output current Iout generated at a charging output terminal thereof and to control charging by the charging execution circuit 11 to be terminated.

Particularly the charging control circuit 43 in the charging apparatus 4 in the present embodiment includes the current adjustment module 231, a voltage adjustment module 432 and a detection control module 430.

The function and the particular implementation of the current adjustment module 231 have been described in the first apparatus embodiment, so a repeated description thereof will be omitted in the present embodiment;

The voltage adjustment module 432 is configured to adjust the nominal voltage reference Vref_s and to output a variable voltage reference Vref_g as a result of adjustment to a voltage reference input terminal of the charging execution circuit 11 (i.e., the negative input terminal of the differential amplifier 112) to control the charging execution circuit 11 to adjust the output voltage Vout and the output current Iout, where the highest voltage value of the variable voltage reference Vref_g is higher than the nominal voltage reference Vref_s, and the lowest voltage value of the variable voltage reference Vref_g is equal to the nominal voltage reference Vref_s;

The detection control module 430 is configured to trigger periodically interruption of charging, to control the current adjustment module 231 and to generate a charging termination signal Fin_b, where the variable current reference Iref_g is limited at the lowest current value above by controlling the current adjustment module 231 in a period of interruption, and the limitation above of the variable current reference Iref_g is removed by controlling the current adjustment module 231 in the period of charging spaced by periods of interruption; and when the output voltage Vout lower than an externally input nominal voltage reference Vref_s by a voltage difference lower than the voltage threshold Th_v1 (which approximately indicates that the kernel voltage V0 of the battery 100 has nearly reached the nominal voltage reference Vref_s) is detected at the end of the period of interruption, to set the charging termination signal Fin_b active to trigger termination of charging; and The detection control module 430 is further configured to control the voltage adjustment module 432, and the variable voltage reference Vref_g has the following several varying status dependent upon the control of the voltage adjustment module 432 by the detection control module 430:

When the voltage difference above higher than or equal to the voltage threshold Th_v1 above and lower than a preset voltage threshold Th_v2 (which indicates the output voltage Vout at the end of the period of interruption will nearly reach the nominal voltage reference Vref_s) is detected at the end of the period of interruption, if the variable voltage reference Vref_g has not reached the lowest voltage value above, then the variable voltage reference Vref_g is adjusted down by the voltage adjustment module 432; and When the voltage difference above higher than a preset voltage threshold Th_v3 (which indicates the output voltage Vout at the end of the period of interruption has not reached the nominal voltage reference Vref_s) is detected at the end of the period of interruption, if the variable voltage reference Vref_g has not reached the highest voltage value above, then the variable voltage reference Vref_g is adjusted up by the voltage adjustment module 432;

Where the voltage threshold Th_v1 is lower than the voltage threshold Th_v2, and the voltage threshold Th_v2 is lower than the voltage threshold Th_v3.

In the present embodiment, reference can be made to the description in the first apparatus embodiment for implementations of setting the lowest current value of the variable current reference Iref_g and "removing the limitation above of the variable current reference Iref_g", so a repeated description thereof will be omitted here.

With the charging control circuit 43 above, the current reference input terminal of the charging execution circuit 11 receives the variable current reference Iref_g instead of the constant nominal current reference Iref_s; and the variable voltage reference Vref_g instead of the constant nominal voltage reference Vref_s is input at the voltage reference input terminal of the charging execution circuit 11.

Since the variable current reference Iref_g will be limited to the lowest current value above in each period of interruption, the output current Iout will be higher and even far higher than the variable current reference Iref_g suddenly changed to the lowest current value each time the period of interruption commences; and correspondingly no matter whether the output voltage Vout at this time has not reached the variable voltage reference Vref_g or has reached or been slightly higher than the variable voltage reference Vref_g, the positive voltage value of the control signal Ctrl_I will be higher than the positive voltage value of the control signal Ctrl_V and control the PMOS 114 (i.e., the adjustable switch) to be turned off or weakly conductive so that the output current Iout will be dropped to be substantially equal to the variable current reference Iref_g limited at the lowest current value.

After the output current Iout is dropped to be substantially equal to the variable current reference Iref_g limited at the lowest current value:

If the output voltage Vout at this time has not reached the variable voltage reference Vref_g, then the PMOS 114 is still controlled by the control signal Ctrl_I and maintained turned off or weakly conductive; and If the output voltage Vout at this time has reached or been slightly higher than the variable voltage reference Vref_g, then such a situation may occur temporarily that the positive voltage value of the control signal Ctrl_V is higher than the positive voltage value of the control signal Ctrl_I, so even if the control signal Ctrl_V controls the PMOS 114 to be more conductive so that the output current Iout becomes higher slightly than the variable current reference Iref_g limited at the lowest current value, the positive voltage value of the control signal Ctrl_I will be higher than the positive voltage value of the control signal Ctrl_V again and control the PMOS 114 again to be less conductive;

As can be apparent, although the nominal voltage reference Vref_s received at the reference voltage input terminal of the charging execution circuit 11 is replaced with the variable voltage reference Vref_g in the present embodiment as opposed to the first apparatus embodiment, after the output current Iout is substantially equal to the variable current reference Iref_g limited at the lowest current value, the status of being substantially equal can still be guaranteed for the period of interruption in the present embodiment as in the first apparatus embodiment.

Thus there will be no substantial influence upon the alleviation of the drawback of insufficient charging no matter whether the nominal voltage reference Vref_s is input at the voltage reference input terminal of the charging execution circuit 11 as described in the first apparatus embodiment.

Correspondingly the drawback of insufficient charging can be alleviated in the present embodiment as in the first apparatus embodiment and the second apparatus embodiment.

Moreover the variable voltage reference Vref_g can be adjusted adaptively to the closeness of the output voltage Vout (approximately the kernel voltage V0 of the battery 100) to the nominal voltage reference Vref_s each time the period of interruption ends in the present embodiment so that:

When the output voltage Vout at the end of the period of interruption will nearly reach the nominal voltage reference Vref_s, it can be approximately considered that the kernel voltage V0 of the battery 100 will nearly reach the nominal voltage reference Vref_s, and correspondingly, over-charging of the battery 100 with the kernel voltage V0 which will nearly reach the nominal voltage reference Vref_s due to the excessive output voltage Vout can be avoided by lowering the variable voltage reference Vref_g so that the output voltage Vout becomes lower in the impending period of charging; and When the output voltage Vout at the end of the period of interruption has not reached the nominal voltage reference Vref_s, it can be approximately considered that the kernel voltage V0 of the battery 100 has not reached the nominal voltage reference Vref_s, and correspondingly the higher output current Iout can be allowed in the impending period of charging by raising the variable voltage reference Vref_g to allow the higher output voltage Vout in the impending period of charging, so that charging of the battery 100 with the kernel voltage V0 which has not reached the nominal voltage reference Vref_s can be speeded up.

As can be apparent, charging can further be speeded up by adjusting the variable voltage reference Vref_g at the end of the period of interruption in the present embodiment as compared with the first apparatus embodiment and the second apparatus embodiment.

Further preferably the detection control module 430 can be further configured to have the variable voltage reference Vref_g reset to the lowest current value above by controlling the voltage adjustment module 432 when the charging termination signal Fin_b is set active.

The respective modules included in the charging control circuit 43 in the charging apparatus 4 based on the present embodiment will be described below in details.

Figure 13:
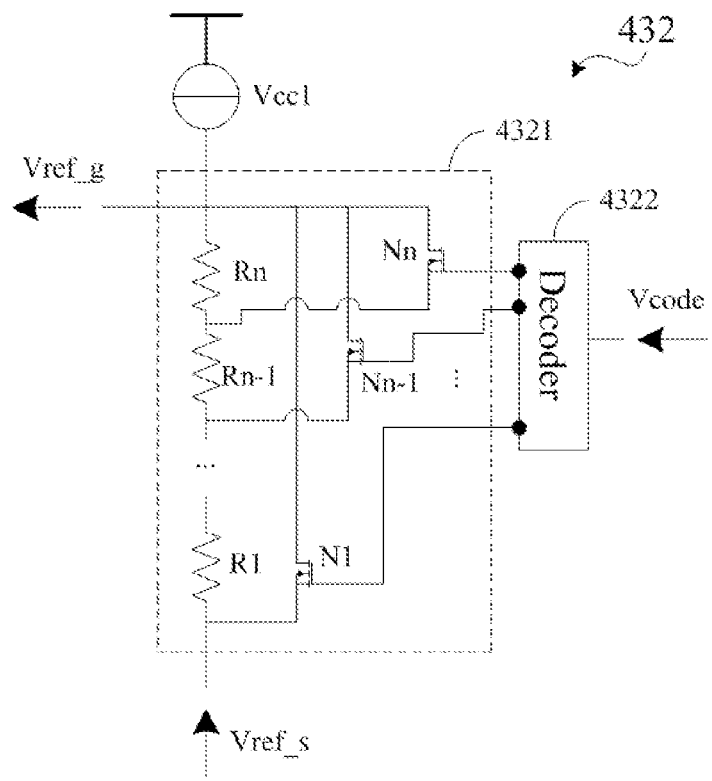
FIG. 13 is a schematic structural diagram of a preferred voltage adjustment module included in a charging control circuit in the charging apparatus based on the third embodiment of the invention.

FIG. 13 is a schematic structural diagram of a preferred voltage adjustment module included in the charging control circuit in the charging apparatus based on the third embodiment of the invention. As illustrated in FIG. 13, the voltage adjustment module 432 includes a resistance-adjustable circuit 4321 with n shifts and an n-bit decoder 4322, where n represents a positive integer higher than 2.

The resistance-adjustable circuit 4321 includes resistors R1 to Rn and NMOS1 to NMOSn.

The resistors R1 to Rn are connected in series into a string of resistors, where the terminal of the string of resistors at the resistor R1 receives the nominal voltage reference Vref_s, and the other terminal of the string of resistors at the resistor Rn is connected with a power source Vcc1 and configured to generate the variable voltage reference Vref_g.

The source S of the NMOS1 is connected with the terminal of the string of resistors at which the nominal voltage reference Vref_s is received, the drain D thereof is connected with the other terminal of the string of resistors at the resistor Rn (that is, connected with the power source Vcc1), and the gate G thereof is connected with the first bit output terminal of the decoder 4322; and The source S of the NMOSj is connected with the terminal of the resistor Rj connected with the resistor Rj−1, the drain D thereof is connected with the other terminal of the string of resistors at the resistor Rn (that is, connected with the power source Vcc1), and the gate G thereof is connected with the j-th bit output terminal of the decoder 4322, where j represents a positive integer higher than and lower than or equal to n.

The decoder 4322 receives a voltage encoded signal Vcode at the input terminal thereof from the detection control module 430 over a voltage control bus and controls level statues of the n output terminals thereof by the voltage encoded signal Vcode.

All the drains D of the NMOS1 to NMOSn are pulled high by the power source Vcc1 so that:

When the first bit output terminal of the decoder 4322 is at a high level, the NMOS1 is turned off; and when the first bit output terminal of the decoder 4322 is at a low level, the NMOS1 is turned on to short all the resistors R1 to Rn so that the variable voltage reference Vref_g is equal to the nominal voltage reference Vref_s, i.e., the lowest voltage value above;

When the j-th bit output terminal of the decoder 4322 is at a high level, the NMOSj is turned off; and when the j-th bit output terminal of the decoder 4322 is at a low level, the NMOSj is turned on to short the resistors Rj to Rn so that there is some increment of the variable voltage reference Vref_g from the nominal voltage reference Vref_s due to the un-shorted resistors R1 to Rj−1 in the case that the NMOS1 to NMOSj are turned off; and If all the n bit output terminals of the decoder 4322 are at a high level to turn off all the NMOS1 to NMOSn, then the variable voltage reference Vref_g has the largest increment from the nominal voltage reference Vref_s, that is, reaches the highest voltage value above, due to the un-shorted resistors R1 to Rn.

Stated otherwise, the different adjustment shifts can be available by shorting different numbers of resistors among the resistors R1 to Rn in the preferred structure as illustrated in FIG. 13. The uniformity or non-uniformity of the respective adjustment shifts can be achieved by setting the resistances of the resistors R1 to Rn.

Of course the voltage adjustment module 432 can alternatively be embodied in another structure, for example, a number of voltage values higher than or equal to the nominal voltage reference Vref_s are provided concurrently based upon the nominal voltage reference Vref_s, and one of the voltage values is selected by the decoder 4322 as the variable voltage reference Vref_g. Moreover the voltage adjustment module 432 can alternatively be controlled in another form of signal than the voltage encoded signal Vcode.

Figure 14:
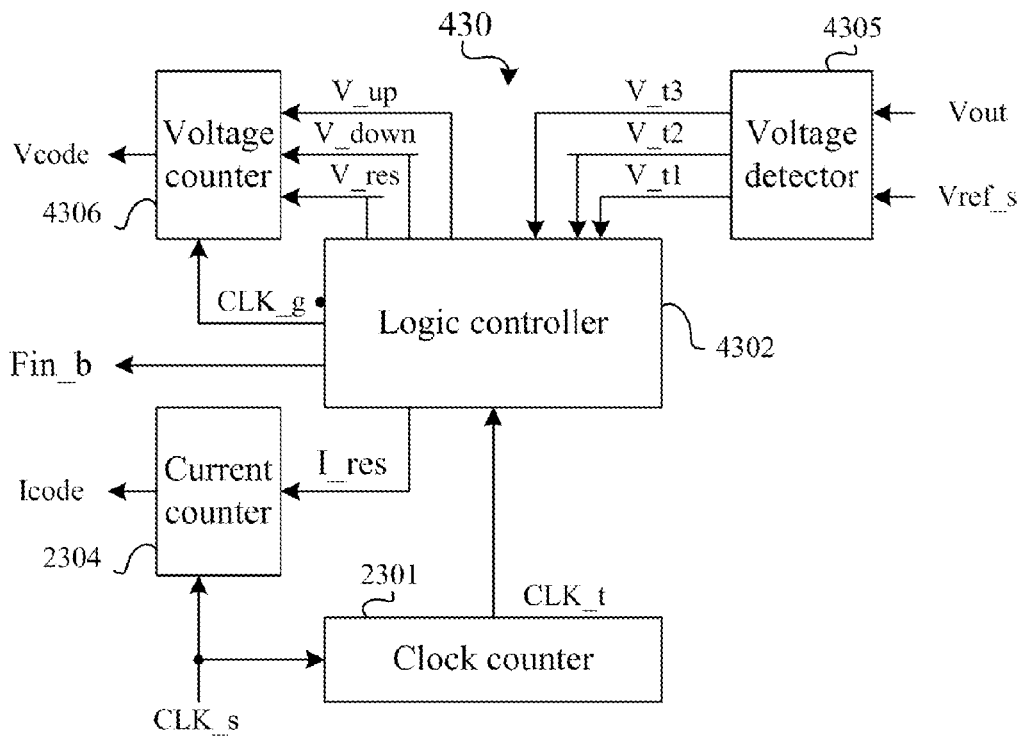
FIG. 14 is a schematic structural diagram of a preferred detection control module included in a charging control circuit in the charging apparatus based on the third embodiment of the invention.

FIG. 14 is a schematic structural diagram of a preferred detection control module included in the charging control circuit in the charging apparatus based on the third embodiment of the invention. As illustrated in FIG. 14, the detection control module 430 includes the clock counter 2301, a logic controller 4302, the current detector 2304, a voltage detector 4305 and a voltage counter 4306.

The clock counter 2301 has been described in the first apparatus embodiment, so a repeated description thereof will be omitted in the present embodiment. Correspondingly the logic controller 4302 periodically triggers interruption of charging based on the interruption clock signal CLK_t generated by the clock counter 2301 in the same way as the logic controller 2302 in the first apparatus embodiment, so a repeated description thereof will also be omitted in the present embodiment.

The current detector 2304 has been described in the first apparatus embodiment, so a repeated description thereof will be omitted in the present embodiment. Correspondingly the logic controller 4302 controls the current detector 2304 by the current reset signal I_res in the same way as the logic controller 2302 in the first apparatus embodiment, so a repeated description thereof will also be omitted in the present embodiment.

The voltage detector 4305 is configured to detect the magnitude of a voltage difference by which the output voltage Vout is lower than the variable voltage reference Vref_g and to generate a voltage detection signal V_t1, a voltage detection signal V_t2 and a voltage detection signal V_t3 based on the magnitude of the voltage difference, where the voltage detection signal V_t1 is active when the voltage difference above is lower than the voltage threshold Th_V1, the voltage detection signal V_t2 is active when the voltage difference above is lower than the voltage threshold Th_V2, and the voltage detection signal V_t3 is active when the voltage difference above is lower than the voltage threshold Th_V3. Definitions of various combinations of levels of the voltage detection signal V_t1, the voltage detection signal V_t2 and the voltage detection signal V_t3 are listed in Table 2 as presented below.

TABLE 2

| V_t1 | V_t2 | V_t3 | Range including ΔV | Definition |
|---|---|---|---|---|
| Active | Active | Active | ΔV < Th_V1 | Vout at the end of the period of interruption (nearly equal to V0) has nearly reached Vref_g |
| Inactive | Active | Active | Th_V1 ≤ ΔV < Th_V2 | Vout at the end of the period of interruption (nearly equal to V0) will nearly reach Vref_g |
| Inactive | Inactive | Active | Th_V2 ≤ ΔV < Th_V3 | There is an appropriate difference of Vout at the end of the period of interruption (nearly equal to V0) from Vref_g |
| Inactive | Inactive | Inactive | Th_V3 ≤ ΔV | Vout at the end of the period of interruption (nearly equal to V0) has been far from reaching Vref_g |

In Table 2, ΔV represents a voltage difference by which the output voltage Vout is lower than the variable voltage reference Vref_g.

Correspondingly the logic controller 4302 is configured to generate an adjustment clock signal CLK_g based on the interruption clock signal CLK_t generated by the clock counter 2301 and to generate the charging termination signal Fin_b, a voltage-down signal V_down and a voltage-up signal V_up based on the interruption clock signal CLK_t and the voltage detection signals V_t1 to V_t3 generated by the voltage detector 4305, where the adjustment clock signal CLK_g is the inverted interruption clock signal CLK_t; and with the definitions of the various combinations of levels depicted in Table 2, the charging termination signal Fin_b, the voltage-down signal V_down and the voltage-up signal V_up generated by the logic controller 4302 vary in level as follow:

When the interruption clock signal CLK_t jumps from being active to an arriving inactive clock edge (at the end of the period of interruption), if the voltage detection signal V_t1 is active, then the charging termination signal Fin_b is set active; otherwise, the charging termination signal Fin_b is maintained inactive;

When the interruption clock signal CLK_t jumps from being active to an arriving inactive clock edge (at the end of the period of interruption), if the voltage detection signal V_t1 is inactive and the voltage detection signal V_t2 is active, then the voltage-down signal V_down is set active; otherwise, the voltage-down signal V_down is maintained inactive; and When the interruption clock signal CLK_t jumps from being active to an arriving inactive clock edge (at the end of the period of interruption), if the voltage detection signal V_t3 is inactive, then the voltage-up signal V_up is set active; otherwise, the voltage-up signal V_up is maintained inactive.

The voltage counter 4306 is configured to perform a counting operation based on the adjustment clock signal CLK_g, the voltage-up signal V_up and the voltage-down signal V_down and to output a result of voltage counting to the voltage adjustment module 432 for adjustment by the voltage adjustment module 432 based on the result of voltage counting (with the voltage adjustment module 432 in the preferred structure as illustrated in FIG. 13, the result of voltage counting can be output to the voltage adjustment module 432 in the form of a voltage encoded signal Vcode for reception at the input terminal of the decoder 4311), where each time the adjustment clock signal CLK_g jumps from being inactive to an arriving active clock edge (at the beginning of the period of interruption):

If the voltage-up signal V_up is active, then a counting operation to increase the result of voltage counting by a voltage counting operation is performed once (with the voltage adjustment module 432 in the preferred structure as illustrated in FIG. 13, the respective voltage adjustment step sizes can be set uniformly, that is, both the adjustment amplitudes of the respective adjustment shifts and the numbers of adjustment shifts corresponding to the respective voltage adjustment step sizes can be set uniformly; or of course the voltage adjustment step sizes may not be set uniformly, that is, the adjustment amplitudes of the respective adjustment shifts may not be set uniformly and the numbers of adjustment shifts corresponding to the respective voltage adjustment step sizes can be set uniformly, or the adjustment amplitudes of the respective adjustment shifts can be set uniformly but each voltage adjustment step size can be set by increasing or decreasing a preceding or succeeding voltage adjustment step size by at least one adjustment shift); and If the voltage-down signal V_down is active, then a counting operation to decrease the result of voltage counting by a voltage counting step size is performed once.

Moreover if it is necessary for the detection control module 430 to further have the variable voltage reference Vref_g reset to the lowest voltage value above by controlling the voltage adjustment module 432 when the charging termination signal Fin_b is set active, then the logic controller 4302 can further generate a voltage reset signal V_res from the charging termination signal Fin_b, where the voltage reset signal V_res is set active when the charging termination signal Fin_b is active, and the voltage reset signal V_res is set inactive when the charging termination signal Fin_b is inactive; and correspondingly the voltage counter 4306 is further configured to perform a counting operation based on the voltage reset signal V_res by performing a counting operation to reset the result of voltage counting to the lowest voltage counting value when the voltage reset signal V_res is active, where the lowest voltage counting value corresponds to the lowest voltage value above, i.e., the nominal voltage reference Vref_s.

The detection control module 330 can perform its corresponding function in the preferred structure above, where the voltage counter 4306 essentially performs the function of a counter well known to those skilled in the art, so a repeated description of an implementation of the voltage counter 4306 will be omitted here; and although a number of implementations of the voltage detector 4305 and the logic controller 4302 can be embodied by those skilled in the art in combinations of various elements, they will be further described below respectively by way of an example.

The voltage detector 4305 detecting the magnitude of a voltage difference by which the output voltage Vout is lower than the nominal voltage reference Vref_s substantially detects the closeness of the output voltage Vout to the nominal voltage reference Vref_s. Then in a particular implementation, firstly the particular voltage value of the voltage difference can be detected and then the particular voltage value of the voltage difference can be compared respectively with the voltage thresholds Th_v1 to Th_v3, or firstly voltage differences equivalent respectively to losses by the voltage thresholds Th_v1 to Th_v3 can be extracted from the nominal voltage reference Vref_s and then the output voltage Vout can be compared respectively with the respective extracted voltage differences.

Figure 15:
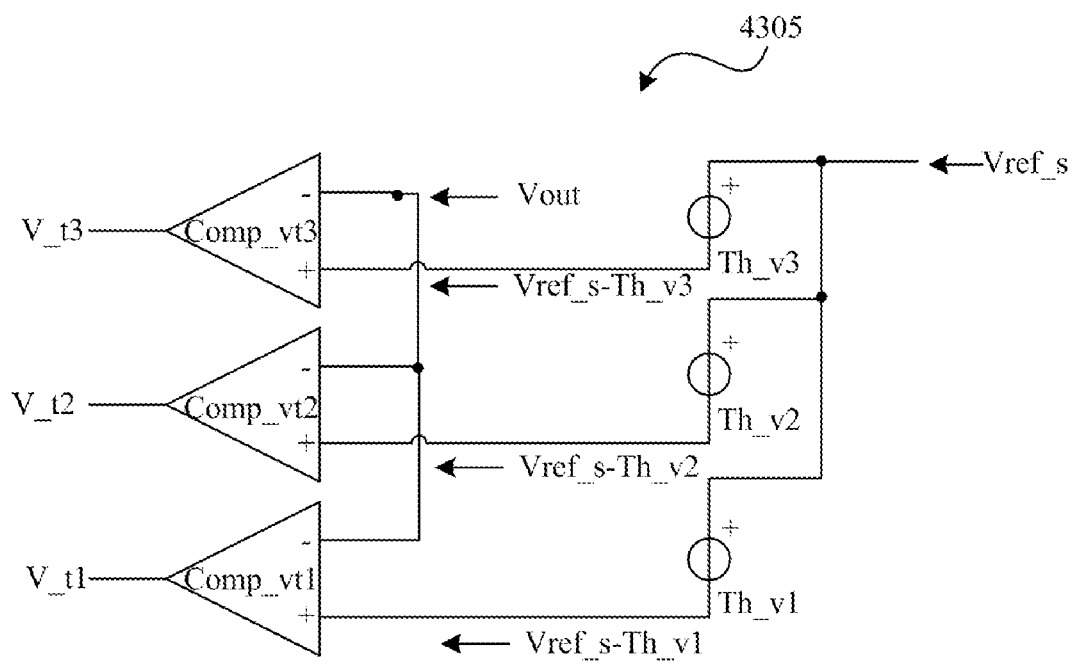
FIG. 15 is a schematic diagram of a particular example of a voltage detector in the detection control module illustrated in FIG. 14.

FIG. 15 is a schematic diagram of a particular example of the voltage detector in the detection control module illustrated in FIG. 14. Firstly voltage differences equivalent respectively to losses by the voltage thresholds Th_v1 to Th_v3 can be extracted from the nominal voltage reference Vref_s and then the output voltage Vout can be compared respectively with the respective voltage differences in FIG. 15.

As illustrated in FIG. 15, the voltage counter 4305 includes three comparators Comp_vt1 to Comp_vt3.

The negative input terminal of the Comp_vt1 receives the output voltage Vout, and the other positive input terminal thereof receives the difference voltage Vref_s-Th_v1 between the nominal voltage reference Vref_s and the voltage threshold Th_v1, and the output terminal of the comparator Comp_vt1 generates the voltage detection signal V_t1, where:

When the output voltage Vout is lower than or equal to the voltage difference Vref_s-Th_v1, this indicates that a voltage difference by which the output voltage Vout is lower than the nominal voltage reference Vref_s is higher than or equal to the voltage threshold Th_v1 (the output voltage Vout has not nearly reached the nominal voltage reference Vref_s), so the voltage detection signal V_t1 at this time is inactive at a high level; and When the output voltage Vout is higher than the voltage difference Vref_s-Th_v1, this indicates that a voltage difference by which the output voltage Vout is lower than the nominal voltage reference Vref_s is lower than the voltage threshold Th_v1 (the output voltage Vout has nearly reached the nominal voltage reference Vref_s), so the voltage detection signal V_t1 at this time is active at a low level.

The negative input terminal of the Comp_vt2 receives the output voltage Vout, and the other positive input terminal thereof receives the difference voltage Vref_s-Th_v2 between the nominal voltage reference Vref_s and the voltage threshold Th_v2, and the output terminal of the comparator Comp_vt2 generates the voltage detection signal V_t2, where:

When the output voltage Vout is lower than or equal to the voltage difference Vref_s-Th_v2, this indicates that a voltage difference by which the output voltage Vout is lower than the nominal voltage reference Vref_s is higher than or equal to the voltage threshold Th_v2 (there is some difference for the output voltage Vout to reach the nominal voltage reference Vref_s), so the voltage detection signal V_t2 at this time is inactive at a high level; and When the output voltage Vout is higher than the voltage difference Vref_s-Th_v2, this indicates that a voltage difference by which the output voltage Vout is lower than the nominal voltage reference Vref_s is lower than the voltage threshold Th_v2 (the output voltage Vout will nearly reach the nominal voltage reference Vref_s), so the voltage detection signal V_t2 at this time is active at a low level.

The negative input terminal of the Comp_vt3 receives the output voltage Vout, and the other positive input terminal thereof receives the difference voltage Vref_s-Th_v3 between the nominal voltage reference Vref_s and the voltage threshold Th_v3, and the output terminal of the comparator Comp_vt3 generates the voltage detection signal V_t3, where:

When the output voltage Vout is lower than or equal to the voltage difference Vref_s-Th_v3, this indicates that a voltage difference by which the output voltage Vout is lower than the nominal voltage reference Vref_s is higher than or equal to the voltage threshold Th_v3 (the output voltage Vout has been far from reaching the nominal voltage reference Vref_s), so the voltage detection signal V_t3 at this time is inactive at a high level; and When the output voltage Vout is higher than the voltage difference Vref_s-Th_v3, this indicates that a voltage difference by which the output voltage Vout is lower than the nominal voltage reference Vref_s is lower than the voltage threshold Th_v3 (there is an acceptable difference by which the output voltage Vout is lower than the nominal voltage reference Vref_s), so the voltage detection signal V_t3 at this time is active at a low level.

The logic controller 4302 generally performs a logic judgment and trigger function.

Figure 16:
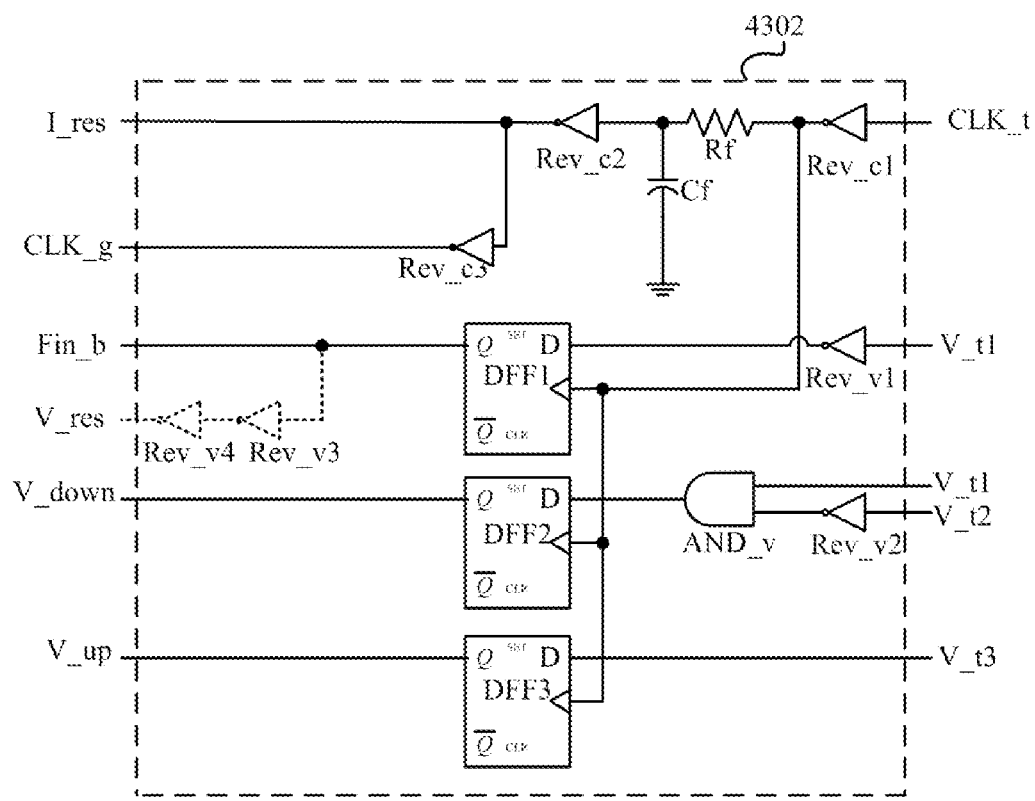
FIG. 16 is a schematic diagram of a particular example of a logic controller in the detection control module illustrated in FIG. 14.

FIG. 16 is a schematic diagram of a particular example of the logic controller in the detection control module illustrated in FIG. 14. A logic judgment and trigger scheme easy to implement is adopted in FIG. 16. As illustrated in FIG. 16, the logic controller 4302 includes inverters Rev_c1 to Rev_c3, a resistor Rf, a capacitor Cf, D flip-flop DFF1 to DFF3, an AND gate AND_v, and inverters Rev_v1 and Rev_v2.

Where the structure in which the current reset signal I_res is generated by the inverters Rev_c1 and Rev_c2, the resistor Rf and the capacitor Cf and the structure in which the charging termination signal Fin_b is generated by the inverter Rev_v1 and the D flip-flop DFF1 in FIG. 16 are the same as the corresponding structures in the first apparatus embodiment as illustrated in FIG. 6, so a repeated description thereof will be omitted here. Moreover:

The reference clock signal CLK_t is inverted by the inverter Rev_c1, delayed by a delay circuit consisted of the resistor Rf and the capacitor Cf and inverted by the inverter Rev_c2 in that order and then inverted by the inverter Rev_c3 to generate the adjustment clock signal CLK_g inverted at some delay from the reference clock signal CLK_t.

The D flip-flop DFF2 is controlled by the reference clock signal CLK_t inverted by the inverter Rev_c1 and triggers inversion of the level status of the voltage-down signal V_down based on a level status output by the AND gate AND_v, and one input terminal of the AND gate AND_v receives the voltage detection signal V_t1, and the other input terminal thereof receives the voltage detection signal V_t2 inverted by the inverter Rev_v2, so that the voltage-down signal V_down is inverted from being inactive at a low level to being active at a high level based on the voltage detection signal V_t1 inactive at a high level and the voltage detection signal V_t2 active at a low level at the rising edge of the inverted reference clock signal CLK_t, that is, when the reference clock signal CLK_t jumps from being active at a high level to an arriving falling edge inactive at a low level (at the end of the period of interruption).

The D flip-flop DFF3 is controlled by the inverted reference clock signal CLK_t inverted by the inverter Rev_c1 and triggers inversion of the level status of the voltage-up signal V_up based on the level status of the voltage detection signal V_t3 so that the voltage-up signal V_up is inverted from being inactive at a low level to being active at a high level based on the voltage detection signal V_t3 inactive at a high level at the rising edge of the inverted reference clock signal CLK_t, that is, when the reference clock signal CLK_t jumps from being active at a high level to an arriving falling edge inactive at a low level (at the end of the period of interruption).

In a practical application, if it is necessary for the detection control module 430 to further have the variable voltage reference Vref_g reset to the lowest voltage value above by controlling the voltage adjustment module 432 when the charging termination signal Fin_b is set active, then the charging termination signal Fin_b has the voltage reset signal V_res generated sequentially through the inverters Rev_v3 and Rev_v4 (represented by a dotted line in FIG. 16) in addition to being output to the charging control circuit 43; and when the charging termination signal Fin_b is active at a high level, the voltage reset signal V_res becomes active at a high level.

Figure 17:
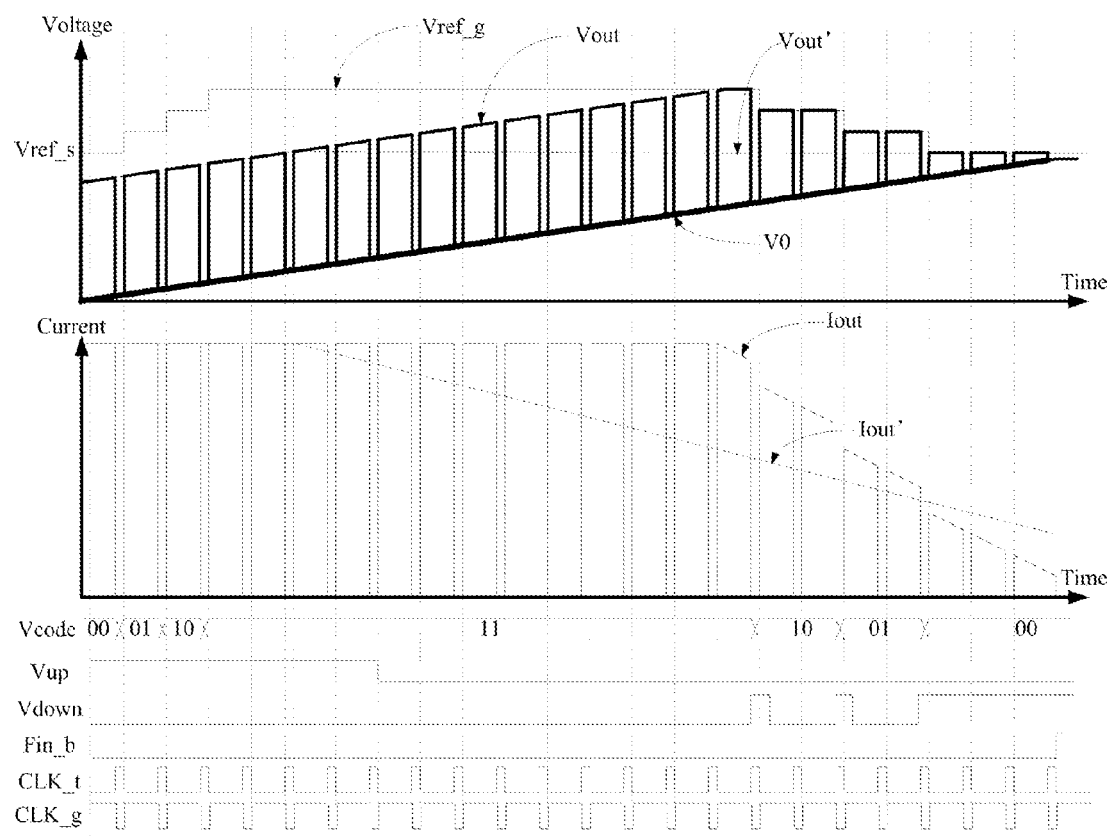
FIG. 17 is a schematic waveform diagram of output voltage and corresponding output current generated by the charging apparatus based on the third embodiment of the invention.

FIG. 17 is a schematic waveform diagram of output voltage and corresponding output current generated by the charging apparatus based on the third embodiment of the invention. FIG. 17 illustrates waveforms of output voltage Vout and output current Iout in a period of charging using the solution of the present embodiment and waveforms of output voltage Vout' and output current Iout' without using the solution of the present embodiment; and the voltage adjustment module 432 in the structure as illustrated in FIG. 13 with n=4 is used in the solution of the present embodiment in FIG. 17 by way of an example.

Referring to FIG. 17, in the period of interruption using the solution of the present embodiment, the output voltage Vout will return to the status of being substantially equal to the kernel voltage V0 of the battery 100 so that the result of voltage counting represented by the voltage encoded signal Vcode will gradually increase with the raising kernel voltage V0 detected by detecting the output voltage Vout each time the period of interruption ends, and thus the output voltage Vout higher than the nominal voltage reference Vref_s can be allowed so that the output current Iout will not become lower after the output voltage Vout reaches the nominal voltage reference Vref_s to thereby speed up charging.

Further referring to FIG. 17, in the period of charging without using the solution of the present embodiment, the output voltage Vout' must not be higher than the nominal voltage reference Vref_s so that the output current Iout' will start to become lower after the output voltage Vout' reaches the nominal voltage reference Vref_s to thereby slow down charging.

In comparison of the output current Iout with Iout' in FIG. 17, the segment the waveform of the output current Iout above the waveform of the output current Iout' represents an increment in current due to speeded-up charging over the period after the output voltage Vout and Vout' reaches the nominal voltage reference Vref_s.

Fourth Apparatus Embodiment

Figure 18:
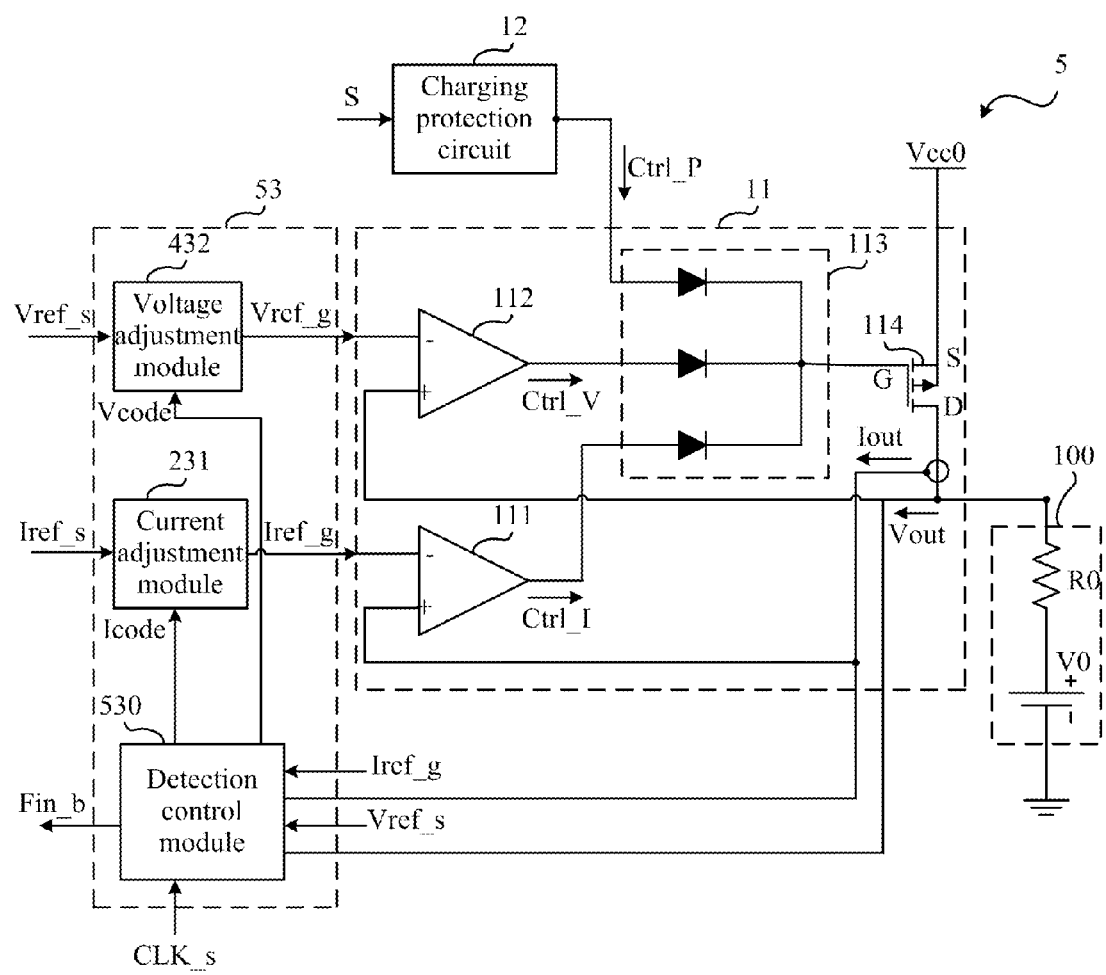
FIG. 18 is a schematic structural diagram of an example of a charging apparatus based on a fourth embodiment of the invention.

FIG. 18 is a schematic structural diagram of an example of a charging apparatus based on a fourth embodiment of the invention. As illustrated in FIG. 18, the charging apparatus 4 configured to charge a battery 100 includes a charging execution circuit 11, a charging protection circuit 12 and a charging control circuit 53.

Where the structures and operation principles of the charging execution circuit 11 and the charging protection circuit 12 are the same as those in the prior art, so a repeated description thereof will be omitted here, and the charging protection circuit 12 is optional instead of being necessary; and the charging control circuit 53 is configured to control the charging execution circuit 11 to adjust output voltage Vout and output current Iout generated at a charging output terminal thereof and to control charging by the charging execution circuit 11 to be terminated.

Particularly the charging control circuit 53 in the charging apparatus 5 in the present embodiment includes the current adjustment module 231, the voltage adjustment module 432 and a detection control module 530.

The function and the particular implementation of the current adjustment module 231 have been described in the first apparatus embodiment, and the function and the particular implementation of the voltage adjustment module 432 have been described in the third apparatus embodiment, so a repeated description of the current adjustment module 231 and the voltage adjustment module 432 will be omitted in the present embodiment;

The detection control module 530 is configured to trigger periodically interruption of charging, to control the current adjustment module 231 and the voltage adjustment module 432 and to generate a charging termination signal Fin_b, where the variable current reference Iref_g is limited at the lowest current value above by controlling the current adjustment module 231 in a period of interruption, and the limitation above of the variable current reference Iref_g is removed by controlling the current adjustment module 231 in the period of charging spaced by periods of interruption; and when the output voltage Vout lower than the nominal voltage reference Vref_s by a voltage difference lower than the preset voltage threshold Th_v1 is detected at the end of the period of interruption, to set the charging termination signal Fin_b active to control charging to be terminated; and Moreover the variable current reference Iref_g with the limitation thereof above being removed has the varying status as described in the second apparatus embodiment dependent upon the control of the current adjustment module 231 by the detection control module 530; and the variable current reference Iref_g has the varying status as described in the third apparatus embodiment dependent upon the control of the voltage adjustment module 432 by the detection control module 530.

With the charging control circuit 53 above, the current reference input terminal of the charging execution circuit 11 receives the variable current reference Iref_g instead of the constant nominal current reference Iref_s; and the variable voltage reference Vref_g instead of the constant nominal voltage reference Vref_s is input at the voltage reference input terminal of the charging execution circuit 11.

Since the variable current reference Iref_g will be limited to the lowest current value above in each period of interruption, the drawback of insufficient charging can be alleviated in the present embodiment as in the first apparatus embodiment, the second apparatus embodiment and the third apparatus embodiment.

Moreover the variable voltage reference Vref_g can be adjusted adaptively to the closeness of the output voltage Vout (approximately equal to the kernel voltage V0 of the battery 100) to the nominal voltage reference Vref_s each time the period of interruption ends in the present embodiment, so charging can further be speeded up in the present embodiment as in the third apparatus embodiment as compared with the first apparatus embodiment and the second apparatus embodiment.

And the variable current reference Iref_g can be adjusted adaptively to the varying output current Iout in the period of charging in the present embodiment, so an instantaneous up-rush of the output current Iout can further be retrained in the present embodiment as in the second apparatus embodiment as compared with the first apparatus embodiment and the third apparatus embodiment.

Further preferably the detection control module 530 can be further configured to have the variable current reference Iref_g reset to the lowest current value above by controlling the current adjustment module 231 and have the variable voltage reference Vref_g reset to the lowest voltage value above by controlling the voltage adjustment module 432 when the charging termination signal Fin_b is set active.

Figure 19:
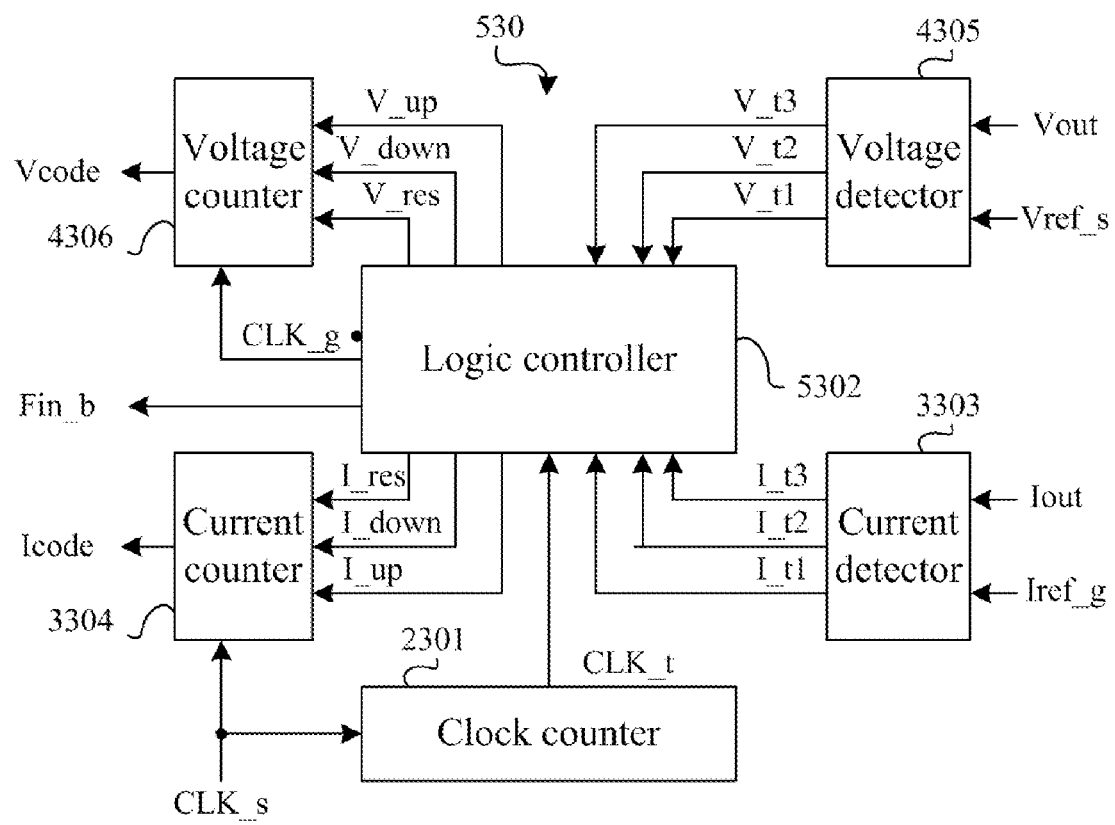
FIG. 19 is a schematic structural diagram of a preferred detection control module included in a charging control circuit in the charging apparatus based on the fourth embodiment of the invention.

FIG. 19 is a schematic structural diagram of a preferred detection control module included in the charging control circuit in the charging apparatus based on the fourth embodiment of the invention. As illustrated in FIG. 19, the detection control module 530 includes the clock counter 2301, a logic controller 5302, the current detector 3303, the current counter 3304, the voltage detector 4305 and the voltage counter 4306.

The clock counter 2301 has been described in the first apparatus embodiment, so a repeated description thereof will be omitted in the present embodiment. Correspondingly the logic controller 5302 periodically triggers interruption of charging based on the interruption clock signal CLK_t generated by the clock counter 2301 in the same way as the logic controller 2302 in the first apparatus embodiment, so a repeated description thereof will also be omitted in the present embodiment.

The current detector 3303 and the current counter 3304 have been described in the second apparatus embodiment, so a repeated description thereof will be omitted in the present embodiment. Correspondingly the logic controller 5302 controls the current counter 3304 based on the current-up signal I_up, the current-down signal I_down and the current reset signal I_res generated by the current detector 3303 in the same way as the logic controller 3302 in the second apparatus embodiment, so a repeated description thereof will also be omitted in the present embodiment.

The voltage detector 4305 and the voltage counter 4306 have been described in the third apparatus embodiment, so a repeated description thereof will be omitted in the present embodiment. Correspondingly the logic controller 5302 controls the voltage counter 3304 based on the charging termination signal Fin_b, the voltage-up signal V_up, the voltage-down signal V_down and the optional voltage reset signal V_res generated by the voltage detector 4305 in the same way as the logic controller 4302 in the third apparatus embodiment, so a repeated description thereof will also be omitted in the present embodiment.

Figure 20:
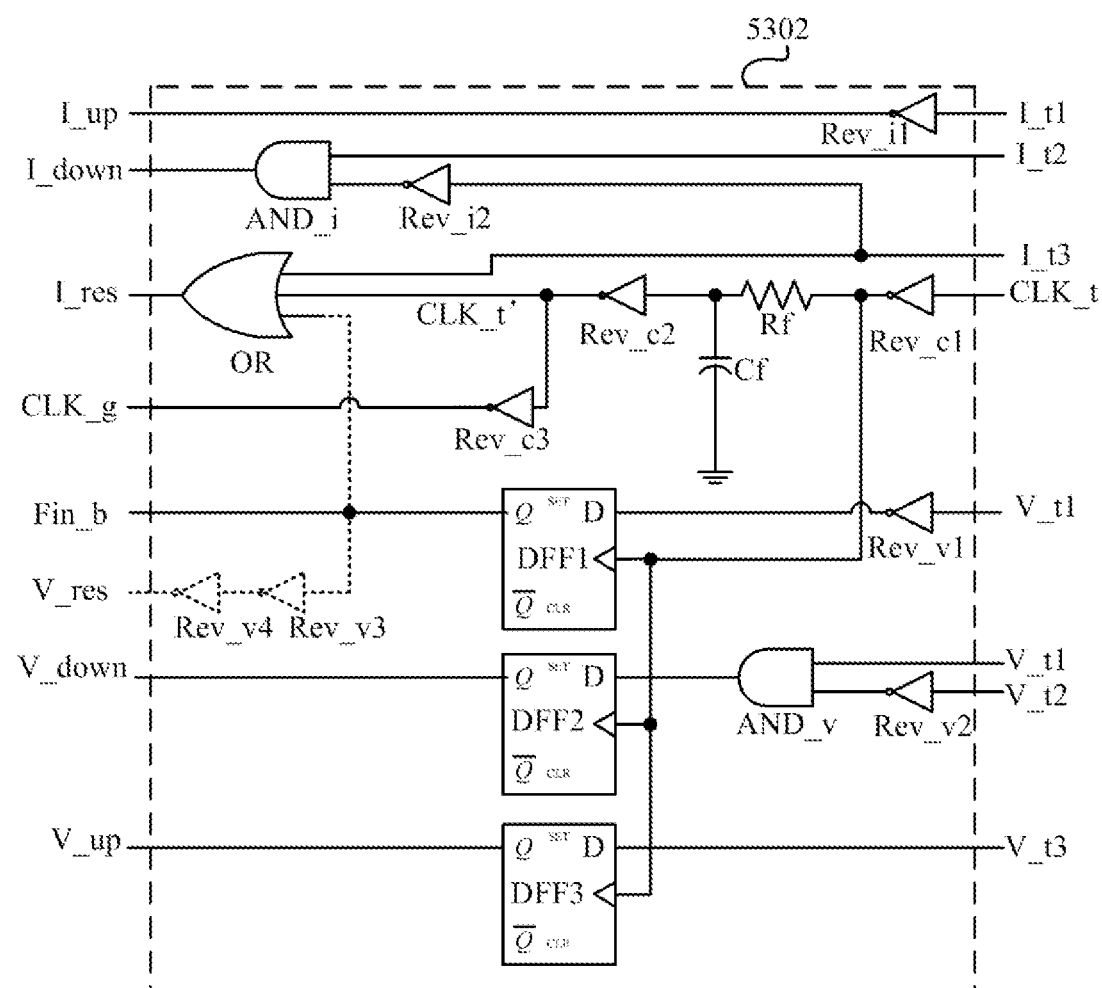
FIG. 20 is a schematic diagram of a particular example of a logic controller in the detection control module illustrated in FIG. 19.

FIG. 20 is a schematic diagram of a particular example of the logic controller in the detection control module illustrated in FIG. 19. A logic judgment and trigger scheme easy to implement is adopted in FIG. 20. As illustrated in FIG. 20, the logic controller 5302 includes inverters Rev_c1 to Rev_c3, a resistor Rf, a capacitor Cf, inverter Rev_i1 and Rev_i2, an AND gate AND_i, an OR gate OR, D flip-flop DFF1 to DFF3, an AND gate AND_v, and inverters Rev_v1 and Rev_v2.

The structure in which the current reset signal I_res is generated by the inverters Rev_c1 and Rev_c2, the resistor Rf, the capacitor Cf and the OR gate OR and the structure in which the current-up signal I_up and the current-down signal I_down are generated by the inverters Rev_i1 and Rev_i2 and the AND gate AND_i in FIG. 20 are the same as the corresponding structures in the second apparatus embodiment as illustrated in FIG. 10, so a repeated description thereof will be omitted here; and The structure in which the adjustment clock signal CLK_g is generated by the inverters Rev_c1 to Rev_c3, the resistor Rf and the capacitor Cf and the structure in which the charging termination signal Fin_b, the voltage-up signal V_down and the voltage-up signal V_up are generated by the D flip-flop DFF1 to DFF3, the AND gate AND_v, and the inverters Rev_v1 and Rev_v2 in FIG. 20 are the same as the corresponding structures in the third apparatus embodiment as illustrated in FIG. 16, so a repeated description thereof will be omitted here.

Optionally when inverters Rev_v3 and Rev_v4 are further included in FIG. 20, the structure in which the voltage reset signal V_res is generated by the inverters Rev_v3 and Rev_v4 (denoted by a dotted line in FIG. 20) is the same as the corresponding structure in the third apparatus embodiment as illustrated in FIG. 16, so a repeated description thereof will be omitted here.

Reference can be made to FIG. 17 for waveforms of output voltage Vout and corresponding output current Iout generated in the present embodiment, and reference can be made to FIG. 11 for a waveform of each rising edge of the output current Iout illustrated in FIG. 17.

The charging apparatuses 2 to 5 and the corresponding charging control circuits 23 to 53 based on the respective apparatus embodiments have been described above in details. A charging control method and a charging method to which the charging control method is applied will be described below in details with reference to several method embodiments.

First Method Embodiment

A charging control method based on the present embodiment includes:

The operation a1 is to adjust an input nominal current reference Iref_s and to output a variable current reference Iref_g as a result of adjustment to control adjustment of output voltage Vout and output current Iout generated in charging, where the lowest current value of the variable current reference Iref_g is lower than the nominal current reference Iref_s, and the highest current value of the variable current reference Iref_g is equal to the nominal current reference Iref_s; and The operation b0 is to trigger periodically interruption of charging, to control the operation a1 and to generate a charging termination signal Fin_b, where the variable current reference Iref_g is limited at the lowest current value above by controlling the current adjustment module 231 in a period of interruption, and the limitation above of the variable current reference Iref_g is removed by controlling the current adjustment module 231 in the period of charging spaced by periods of interruption; and when the output voltage Vout lower than an externally input nominal voltage reference Vref_s by a voltage difference lower than a preset voltage threshold Th_v1 (which approximately indicates that the kernel voltage V0 of the battery 100 has nearly reached the nominal voltage reference Vref_s) is detected at the end of the period of interruption, to set the charging termination signal Fin_b active to trigger termination of charging.

In the present embodiment, reference can be made to the description in the first apparatus embodiment for implementations of setting the lowest current value of the variable current reference Iref_g and "removing the limitation above of the variable current reference Iref_g", so a repeated description thereof will be omitted here.

In a charging method based on the present embodiment based upon the charging control method in the present embodiment, the output voltage Vout and the output current Iout is generated in charging and controlled by the variable current reference Iref_g and the nominal voltage reference Vref_s to be adjusted under the same principle as the charging execution circuit 11.

Since the variable current reference Iref_g will be limited to the lowest current value above in each period of interruption, the drawback of insufficient charging can be alleviated in the charging control method and the charging method in the present embodiment as in the first apparatus embodiment.

Moreover in a particular implementation of the present embodiment:

Periodically triggering termination of charging in the operation b0 can include: counting the reference clock signal CLK_s and generating the interruption clock signal CLK_t from a result of counting, where the active interruption clock signal CLK_t indicates the period of interruption, and the inactive interruption clock signal CLK_t indicates the period of charging.

Detecting the current difference above and controlling the operation a1 in the operation b0 can include:

The operation b111 is to generate the current reset signal I_res from the interruption clock signal CLK_t, where the current reset signal I_res is set active when the interruption clock signal CLK_t is active; and The operation b112 is to perform a counting operation based on the reference clock signal and the current reset signal I_res and to provide a result of current counting to the operation a1 for adjustment by the current adjustment module 231 based on the result of current counting, where each time the reference clock signal CLK_s jumps from being inactive to an arriving active clock edge (at the end of the period of interruption):

If the current reset signal I_res is active, then a counting operation to reset the result of current counting to the lowest current counting value is performed once, where the lowest current counting value corresponds the lowest current value of the variable current reference Iref_g; and If the current reset signal I_res is inactive, then a counting operation to increase the result of current counting by a current adjustment step size is performed once until the highest current counting value or a preset default current counting value is reached, where the highest current counting value corresponds to the highest current value of the variable current reference Iref_g (i.e., the nominal current reference Iref_s), and the default current counting value corresponds to the pre-selected default current value mentioned above, that is, in order that "the limitation above of the variable current reference Iref_g is removed", this can be performed by constantly counting to adjust rapidly the variable current reference Iref_g to the highest current value and maintaining it stably at the highest current value for the period of charging or by adjusting the variable current reference Iref_g to a pre-selected default current value higher than the lowest current value and lower than or equal to the highest current value and maintaining it stably at the default current value for the period of charging.

Detecting the voltage difference above and generating the charging termination signal Fin_b in the operation b0 can include:

The operation b121 is to detect the magnitude of a voltage difference by which the output voltage Vout is lower than the nominal voltage reference Vref_s and to generate a voltage detection signal V_t1 based on the magnitude of the voltage difference, where the voltage detection signal V_t1 is active when the voltage difference is lower than the voltage threshold Th_v1, that is, the active voltage detection signal V_t1 indicates that the output voltage Vout has nearly reached the nominal voltage reference Vref_s; and The operation b122 is to generate the charging termination signal Fin_b from the interruption clock signal CLK_t and the voltage detection signal V_t1, where when the interruption clock signal CLK_t jumps from being active to an arriving inactive clock edge, if the voltage detection signal V_t1 is active (which approximately indicates at the end of the period of interruption that the kernel voltage V0 of the battery 100 has nearly reached the nominal voltage reference Vref_s), then the charging termination signal Fin_b is set active.

Second Method Embodiment

A charging control method based on the present embodiment still includes the operation a1 and the operation b0 in the first method embodiment, but "the limitation above of the variable current reference Iref_g is removed" adaptively in the operation b0 in the present embodiment so that the variable current reference Iref_g with the limitation above removed has the varying status as described in the second apparatus embodiment.

In a charging method based on the present embodiment based upon the charging control method in the present embodiment, the output voltage Vout and the output current Iout is generated in charging and controlled by the variable current reference Iref_g and the nominal voltage reference Vref_s to be adjusted under the same principle as the charging execution circuit 11.

Since the variable current reference Iref_g will be limited to the lowest current value above in each period of interruption, the drawback of insufficient charging can be alleviated in the charging control method and the charging method in the present embodiment as in the first method embodiment.

Moreover the variable current reference Iref_g can be adjusted adaptively to the varying output current Iout in the period of charging in the present embodiment, so an instantaneous up-rush of the output current Iout can further be restrained in the period of charging in the present embodiment as in the second apparatus embodiment as compared with the first method embodiment.

Further preferably in the present embodiment, the operation b0 can be further configured to have the variable current reference Iref_g reset to the lowest current value above by controlling the operation a1 when the charging termination signal Fin_b is set active to thereby avoid an instantaneous up-rush of the output current Iout at the beginning of the next time of charging.

Moreover in a particular implementation of the present embodiment:

Periodically triggering termination of charging in the operation b0 can be performed as in the first method embodiment, so a repeated description thereof will be omitted here.

Detecting the current difference above and controlling the operation a1 in the operation b0 can include:

The operation b211 is to detect the magnitude of a current difference by which the output current Iout is lower than the variable current reference Iref_g and to generate a current detection signal I_t1, a current detection signal I_t2 and a current detection signal I_t3 based on the magnitude of the current difference, where the current detection signal I_t1 is active when the current difference above is lower than the current threshold Th_i1, the current detection signal I_t2 is active when the current difference above is lower than the current threshold Th_i2, and the current detection signal I_t3 is active when the current difference above is lower than the current threshold Th_i3.

The operation b212 is to generate a current-up signal I_up, a current-down signal I_down and a current reset signal I_res based on the interruption clock signal CLK_t generated by the clock counter 2301 and the current detection signals I_t1 to I_t3 generated by the current detector 3303, where with the definitions of the various combinations of levels depicted in Table 1 in the second apparatus embodiment, the generated current-up signal I_up, current-down signal I_down and current reset signal I_res vary in level as follow:

When the interruption clock signal CLK_t is inactive (in the period of charging), if the current detection signal I_t1 is active (which indicates that the output current Iout has been very close to the current variable current reference Iref_g), then the current-up signal I_up is set active; otherwise, the current-up signal I_up is maintained inactive;

When the interruption clock signal CLK_t is inactive, if the current detection signal I_t2 is inactive and the current detection signal I_t3 is active (which indicates that the output current Iout has been significantly lower than the current variable current reference Iref_g), then the current-up signal I_down is set active; otherwise, the current-up signal I_down is maintained inactive;

When the interruption clock signal CLK_t is inactive, if the current detection signal I_t3 is inactive (which indicates that the output current Iout has been far lower than the current variable current reference Iref_g), then the current reset signal I_res is set active; and when the interruption clock signal CLK_t is active (the period of interruption is entered), the current reset signal I_res is set active; and When the current detection signal I_t3 is inactive and a delayed reference clock signal CLK_t' is inactive (which indicates the period of charging), the current reset signal I_res is set inactive.

The operation b213 is configured to perform a counting operation based on the reference clock signal CLK_s, the current-up signal I_up, the current-down signal I_down and the current reset signal I_res and to output a result of current counting to the operation a1 for adjustment by the operation a1 based on the result of current counting, where each time the reference clock signal CLK_s jumps from being inactive to an arriving active clock edge:

If the current-up signal I_up is active, then a counting operation to increase the result of current counting by a current adjustment step size is performed once (the respective current adjustment step sizes can be set uniformly, or the current adjustment step sizes may not be set uniformly);

If the current-down signal I_down is active, then a counting operation to decrease the result of current counting by a current adjustment step size is performed once; and If the current reset signal I_res is active, then a counting operation to reset the result of current counting to the lowest current counting value is performed once, where the lowest current counting value corresponds to the lowest current value above.

Detecting the voltage difference above and generating the charging termination signal Fin_b in the operation b0 can be performed as in the first method embodiment, so a repeated description thereof will be omitted here.

Moreover if it is necessary for the operation b0 to further have the variable current reference Iref_g reset to the lowest current value above by controlling the operation a1 when the charging termination signal Fin_b is set active, then the operation b211 can be further configured to reset the current reset signal I_res active when the charging termination signal Fin_b is active. In this case, the current reset signal I_res is set inactive at a low level when the current detection signal I_t3 is inactive, the charging termination signal Fin_b is inactive and the delayed reference clock signal CLK_t' is inactive indicating the period of charging.

Third Method Embodiment

A charging control method based on the present embodiment includes the operation a1 and the operation b0 in the first method embodiment, but the charging control method in the present embodiment further includes:

The operation a2 is to adjust a nominal voltage reference Vref_s and to output a variable voltage reference Vref_g as a result of adjustment to control adjustment of the output voltage Vout and the output voltage Iout generated in charging, where the highest voltage value of the variable voltage reference Vref_g is higher than the nominal voltage reference Vref_s, and the lowest voltage value of the variable voltage reference Vref_g is equal to the nominal voltage reference Vref_s; and Correspondingly the operation b0 is further configured to control the operation a2, and the variable voltage reference Vref_g has the varying status as described in the third apparatus embodiment dependent upon the control of the operation a2 by the operation b0.

In a charging method based on the present embodiment based upon the charging control method in the present embodiment, the output voltage Vout and the output current Iout is generated in charging and controlled by the variable current reference Iref_g and the variable voltage reference Vref_g to be adjusted under the same principle as the charging execution circuit 11.

Since the variable current reference Iref_g will be limited to the lowest current value above in each period of interruption, the drawback of insufficient charging can be alleviated in the charging control method and the charging method in the present embodiment as in the first method embodiment and the second method embodiment.

Moreover the variable voltage reference Vref_g can be adjusted adaptively to the closeness of the output voltage Vout (approximately equal to the kernel voltage V0 of the battery 100) to the nominal voltage reference Vref_s each time the period of interruption ends in the present embodiment, so under the same principle as the third apparatus embodiment, charging can further be speeded up by adjusting the variable voltage reference Vref_g at the end of the period of interruption in the present embodiment as compared with the first method embodiment and the second method embodiment.

Further preferably the operation b0 can be further configured to have the variable voltage reference Vref_g reset to the lowest voltage value above by controlling the operation a2 when the charging termination signal Fin_b is set active.

Moreover in a particular implementation of the present embodiment:

Periodically triggering termination of charging in the operation b0 can be performed as in the first method embodiment, so a repeated description thereof will be omitted here.

Detecting the current difference above and controlling the operation a1 in the operation b0 can be performed as in the first method embodiment, so a repeated description thereof will be omitted here.

Detecting the voltage difference above, generating the charging termination signal Fin_b and controlling the operation a2 in the operation b0 can include:

The operation b321 is to detect the magnitude of a voltage difference by which the output voltage Vout is lower than the variable voltage reference Vref_g and to generate a voltage detection signal V_t1, a voltage detection signal V_t2 and a voltage detection signal V_t3 based on the magnitude of the voltage difference, where the voltage detection signal V_t1 is active when the voltage difference above is lower than the voltage threshold Th_V1, the voltage detection signal V_t2 is active when the voltage difference above is lower than the voltage threshold Th_V2, and the voltage detection signal V_t3 is active when the voltage difference above is lower than the voltage threshold Th_V3; and The operation b322 is to generate an adjustment clock signal CLK_g based on the interruption clock signal CLK_t and to generate the charging termination signal Fin_b, a voltage-down signal V_down and a voltage-up signal V_up based on the interruption clock signal CLK_t and the voltage detection signals V_t1 to V_t3 generated by the voltage detector 4305, where the adjustment clock signal CLK_g is the inverted interruption clock signal CLK_t; and with the definitions of the various combinations of levels depicted in Table 2 in the third apparatus embodiment, the generated charging termination signal Fin_b, voltage-down signal V_down and voltage-up signal V_up vary in level as follow:

When the interruption clock signal CLK_t jumps from being active to an arriving inactive clock edge (at the end of the period of interruption), if the voltage detection signal V_t1 is active, then the charging termination signal Fin_b is set active; otherwise, the charging termination signal Fin_b is maintained inactive;

When the interruption clock signal CLK_t jumps from being active to an arriving inactive clock edge (at the end of the period of interruption), if the voltage detection signal V_t1 is inactive and the voltage detection signal V_t2 is active, then the voltage-down signal V_down is set active; otherwise, the voltage-down signal V_down is maintained inactive; and When the interruption clock signal CLK_t jumps from being active to an arriving inactive clock edge (at the end of the period of interruption), if the voltage detection signal V_t3 is inactive, then the voltage-up signal V_up is set active; otherwise, the voltage-up signal V_up is maintained inactive; and The operation b323 is to perform a counting operation based on the adjustment clock signal CLK_g, the voltage-up signal V_up and the voltage-down signal V_down and to output a result of voltage counting to the operation a2 for adjustment by the operation a2 based on the result of voltage counting, where each time the adjustment clock signal CLK_g jumps from being inactive to an arriving active clock edge (at the beginning of the period of interruption):

If the voltage-up signal V_up is active, then a counting operation to increase the result of voltage counting by a voltage counting step size is performed once (the respective voltage adjustment step sizes can be set uniformly, or the voltage adjustment step sizes may not be set uniformly); and If the voltage-down signal V_down is active, then a counting operation to decrease the result of voltage counting by a voltage counting step size is performed once.

Moreover if it is necessary for the operation b0 to further have the variable voltage reference Vref_g reset to the lowest voltage value above by controlling the operation a2 when the charging termination signal Fin_b is set active, then the operation b322 can be further configured to generate a voltage reset signal V_res from the charging termination signal Fin_b, where the voltage reset signal V_res is set active when the charging termination signal Fin_b is active, and the voltage reset signal V_res is set inactive when the charging termination signal Fin_b is inactive; and correspondingly the operation b323 is further configured to perform a counting operation based on the voltage reset signal V_res by performing a counting operation to reset the result of voltage counting to the lowest voltage counting value when the voltage reset signal V_res is active, where the lowest voltage counting value corresponds to the lowest voltage value above, i.e., the nominal voltage reference Vref_s.

Fourth Method Embodiment

A charging control method based on the present embodiment still includes the operation a1 in the first method embodiment and the operation a2 and the operation b0 in the third method embodiment, but "the limitation above of the variable current reference Iref_g is removed" in the operation b0 in the present embodiment adaptively as in the second method embodiment.

In a charging method based on the present embodiment based upon the charging control method in the present embodiment, the output voltage Vout and the output current Iout is generated in charging and controlled by the variable current reference Iref_g and the variable voltage reference Vref_g to be adjusted under the same principle as the charging execution circuit 11.

Since the variable current reference Iref_g will be limited to the lowest current value above in each period of interruption, the drawback of insufficient charging can be alleviated in the charging control method and the charging method in the present embodiment as in the first method embodiment, the second method embodiment and the third method embodiment.

Moreover the variable voltage reference Vref_g can be adjusted adaptively to the closeness of the output voltage Vout (approximately equal to the kernel voltage V0 of the battery 100) to the nominal voltage reference Vref_s each time the period of interruption ends in the present embodiment, so charging can further be speeded up by adjusting the variable voltage reference Vref_g at the end of the period of interruption in the present embodiment as compared with the first method embodiment and the second method embodiment.

And the variable current reference Iref_g can also be adjusted adaptively to the varying output current Iout in the period of charging in the present embodiment, so an instantaneous up-rush of the output current Iout can further be retrained in the present embodiment as compared with the first method embodiment and the third method embodiment.

Further preferably in the present embodiment, the operation b0 can be further configured to have the variable current reference Iref_g reset to the lowest current value above by controlling the operation a1 and have the variable voltage reference Vref_g reset to the lowest voltage value above by controlling the operation a2 when the charging termination signal Fin_b is set active.

Moreover in a particular implementation of the present embodiment:

Periodically triggering termination of charging in the operation b0 can be performed as in the first method embodiment, so a repeated description thereof will be omitted here.

Detecting the current difference above and controlling the operation a1 in the operation b0 can be performed as in the second method embodiment, so a repeated description thereof will be omitted here.

Detecting the voltage difference above, generating the charging termination signal Fin_b and controlling the operation a2 in the operation b0 can be performed as in the third method embodiment, so a repeated description thereof will be omitted here.

Based upon understanding of the respective embodiments above, the technical solution of the invention essentially or the part thereof contributing to the prior art can be embodied in the form of hardware or a software product. Particularly when the technical solution of the invention is embodied in the form of a software product, a system or an apparatus can be provided with a machine readable storage medium, on which software program codes to perform the functions of the charging control apparatus and the charging control method above are stored, and with a computer (or a CPU or an MPU) which fetches and executes the program codes stored in the storage medium.

In this case, the program codes per se fetched from the storage medium can be executed to perform the functions of the charging control apparatus and the charging control method above, so the program codes and the storage medium with the program codes stored thereon constitute parts to implement the technical solutions of the charging control apparatus and the charging control method above.

Embodiments of the storage mediums to provide the program codes include a floppy disk, a hard disk, an optical-magnetic disk, an optical disk (e.g., a CD-ROM, a CD-R, a CD-RW, a DVD-ROM, a DVD-RAM, a DVD-RW, a DVD+RW, etc.), a magnetic tape, a nonvolatile memory card, an ROM, etc. Optionally the program codes can be downloaded from a server computer over a communication network.

Moreover it shall be noted that a part or all of the real operations can be performed by both executing the program codes fetched by the computer and enabling an operating system operative on the computer based on instructions of the program codes to thereby perform the functions of any one of the embodiments above.

Moreover it shall be appreciated that the program codes fetched from the storage medium can be written into a memory arranged in an expansion board inside the computer or written into a memory arranged in an expansion unit connected with the computer, and thereafter a CPU, etc., installed on the expansion board or the expansion unit can be caused by the instructions of the program codes to perform a part or all of the real operations to thereby perform the functions of the charging control apparatus and the charging control method above.

The preferred embodiments of the invention have been described above without limiting the invention, and any modifications, equivalent substitutions, adaptations, etc., made without departing from the spirit and principle of the invention shall be encompassed in the claimed scope of the invention.

The invention claimed is:

1. A charging control circuit, wherein the charging control circuit is configured to control a charging execution circuit to adjust output voltage and output current generated at a charging output terminal thereof and to control charging by the charging execution circuit to be terminated, and the charging control circuit comprises a current adjustment module and a detection control module, and wherein:

the current adjustment module is configured to adjust an externally input first current reference and to output a second current reference as a result of adjustment to a current reference input terminal of the charging execution circuit to control the charging execution circuit to adjust the output voltage and the output current, wherein a lowest current value of the second current reference is lower than the first current reference, and a highest current value of the second current reference is equal to the first current reference; and the detection control module is configured to trigger periodically interruption of charging, to control the current adjustment module and to generate a charging termination signal, wherein the second current reference is limited at the lowest current value by controlling the current adjustment module in a period of interruption, and the limitation of the second current reference is removed by controlling the current adjustment module in a period of charging spaced by periods of interruption; and when the output voltage lower than an externally input first voltage reference by a voltage difference lower than a preset first voltage threshold is detected at the end of the period of interruption, to set the charging termination signal active to trigger termination of charging.

2. The charging control circuit of claim 1, wherein the detection control module is further configured to control the current adjustment module so that:

when the output current lower than the second current reference by a current difference lower than a first current threshold is detected in the period of charging, if the second current reference has not reached the highest current value, then the second current reference with the limitation removed is adjusted up by the current adjustment module;

when the current difference higher than or equal to a preset second current threshold and lower than a preset third current threshold is detected in the period of charging, if the second current reference has not reached the lowest current value, then the second current reference with the limitation removed is adjusted down by the current adjustment module; and when the current difference higher than or equal to the third current threshold is detected in the period of charging, if the second current reference has not reached the lowest current value, then the second current reference with the limitation removed is reset to the lowest current value by the current adjustment module; and wherein the first current threshold is lower than the second current threshold, and the second current threshold is lower than the third current threshold.

3. The charging control circuit of claim 1, wherein the charging control circuit further comprises a voltage adjustment module configured to adjust the first voltage reference and to output a second voltage reference as a result of adjustment to a voltage reference input terminal of the charging execution circuit to control the charging execution circuit to adjust the output voltage and the output current, and wherein the highest voltage value of the second voltage reference is higher than the first voltage reference, and the lowest voltage value thereof is equal to the first voltage reference; and the detection control circuit is further configured to control the voltage adjustment module so that:

when the voltage difference higher than or equal to the first voltage threshold and lower than a preset second voltage threshold is detected at the end of the period of interruption, if the second voltage reference has not reached the lowest voltage value, then the second voltage reference is adjusted down by the voltage adjustment module;

when the voltage difference higher than a preset third voltage threshold is detected at the end of the period of interruption, if the second voltage reference has not reached the highest voltage value, then the second voltage reference is adjusted up by the voltage adjustment module; and wherein the first voltage threshold is lower than the second voltage threshold, and the second voltage threshold is lower than the third voltage threshold.

4. The charging control circuit of claim 3, wherein the detection control module is further configured to control the current adjustment module so that:

when the output current lower than the second current reference by a current difference lower than a first current threshold is detected in the period of charging, if the second current reference has not reached the highest current value, then the second current reference with the limitation removed is adjusted up by the current adjustment module;

when the current difference higher than or equal to a preset second current threshold and lower than a preset third current threshold is detected in the period of charging, if the second current reference has not reached the lowest current value, then the second current reference with the limitation removed is adjusted down by the current adjustment module; and when the current difference higher than or equal to the third current threshold is detected in the period of charging, if the second current reference has not reached the lowest current value, then the second current reference with the limitation removed is reset to the lowest current value by the current adjustment module; and wherein the first current threshold is lower than the second current threshold, and the second current threshold is lower than the third current threshold.

5. The charging control circuit of claim 4, wherein the detection control module comprises a clock counter, a logic controller, a current detector, a current counter, a voltage detector and a voltage counter, and wherein:

the clock counter is configured to count a reference clock signal and to generate an interruption clock signal based on a result of counting, wherein the active interruption clock signal indicates the period of interruption, and the inactive interruption clock signal indicates the period of charging;

the current detector is configured to detect the magnitude of the current difference and to generate a first current detection signal, a second current detection signal and a third current detection signal based on the magnitude of the current difference, wherein the first current detection signal is active when the current difference is lower than the first current threshold, the second current detection signal is active when the current difference above is lower than the second current threshold, and the third current detection signal is active when the current difference above is lower than the third current threshold;

the logic controller is configured to generate a current-up signal, a current-down signal and a current reset signal based on the interruption clock signal, the first current detection signal, the second current detection signal and the third current detection signal, wherein when the interruption clock signal is inactive, if the first current detection signal is active, then the current-up signal is set active, if the second current detection signal is inactive and the third current detection signal is active, then the current-down signal is set active, and if the third current detection signal is inactive, then the current reset signal is set active; and when the interruption clock signal is active, then the current reset signal is set active;

the current counter is configured to perform a counting operation based on the reference clock signal, the current-up signal, the current-down signal and the current reset signal and to output a result of current counting to the current adjustment module for adjustment by the current adjustment module based on the result of current counting, wherein each time the reference clock signal jumps from being inactive to an arriving active clock edge, if the current-up signal is active, then a counting operation to increase the result of current counting by a current adjustment step size is performed once, if the current-down signal is active, then a counting operation to decrease the result of current counting by a current adjustment step size is performed once; and if the current reset signal is active, then a counting operation to reset the result of current counting to the lowest current counting value is performed once, wherein the lowest current counting value corresponds to the lowest current value; and the voltage detector is configured to detect the magnitude of the voltage difference and to generate a first voltage detection signal, a second voltage detection signal and a third voltage detection signal based on the magnitude of the voltage difference, wherein the first voltage detection signal is active when the voltage difference is lower than the first voltage threshold, the second voltage detection signal is active when the voltage difference above is lower than the second voltage threshold, and the third voltage detection signal is active when the voltage difference above is lower than the third voltage threshold;

the logic controller is further configured to generate an adjustment clock signal based on the interruption clock signal and to generate the charging termination signal, a voltage-down signal and a voltage-up signal based on the interruption clock signal, the first voltage detection signal, the second voltage detection signal and the third voltage detection signal, wherein the adjustment clock signal is the inverted interruption clock signal; and when the interruption clock signal jumps from being active to an arriving inactive clock edge, if the first voltage detection signal is active, then the charging termination signal is set active, if the first voltage detection signal is inactive and the second voltage detection signal is active, then the voltage-down signal is set active, and if the third voltage detection signal is inactive, then the voltage-up signal is set active; and the voltage counter is configured to perform a counting operation based on the adjustment clock signal, the voltage-up signal and the voltage-down signal and to output a result of voltage counting to the voltage adjustment module for adjustment by the voltage adjustment module based on the result of voltage counting, wherein each time the adjustment clock signal jumps from being inactive to an arriving active clock edge, if the voltage-up signal is active, then a counting operation to increase the result of voltage counting by a voltage counting step size is performed once, and if the voltage-down signal is active, then a counting operation to decrease the result of voltage counting by a voltage counting step size is performed once.

6. The charging apparatus, wherein the charging apparatus comprises the charging control circuit of claim 1.

7. A charging control method for controlling adjustment of output voltage and output current generated in charging and triggering termination of charging, wherein the charging control method comprises:
  the operation a1 of adjusting an input first current reference and outputting a second current reference as a result of adjustment to control the output voltage and the output current to be adjusted, wherein a lowest current value of the second current reference is lower than the first current reference, and a highest current value of the second current reference is equal to the first current reference; and
  the operation b0 of triggering periodically interruption of charging, controlling the operation a1 and generating a charging termination signal, wherein the second current reference is limited at the lowest current value by controlling the current adjustment module in a period of interruption, and the limitation of the second current reference is removed by controlling the current adjustment module in a period of charging spaced by periods of interruption; and when the output voltage lower than an externally input first voltage reference by a voltage difference lower than a preset first voltage threshold is detected at the end of the period of interruption, setting the charging termination signal active to trigger termination of charging.

8. The charging control method of claim 7, wherein:
  when the output current lower than the second current reference by a current difference lower than a first current threshold is detected in the period of charging, if the second current reference has not reached the highest current value, then the second current reference with the limitation removed is adjusted up by the operation a1;
  when the current difference higher than or equal to a preset second current threshold and lower than a preset third current threshold is detected in the period of charging, if the second current reference has not reached the lowest current value, then the second current reference with the limitation removed is adjusted down by the operation a1; and
  when the current difference higher than or equal to the third current threshold is detected in the period of charging, if the second current reference has not reached the lowest current value, then the second current reference with the limitation removed is reset to the lowest current value by the operation a1; and
  wherein the first current threshold is lower than the second current threshold, and the second current threshold is lower than the third current threshold.

9. The charging control method of claim 7, wherein the charging control method further comprises the operation a2 of adjusting the first voltage reference and outputting a second voltage reference as a result of adjustment to control the output voltage and the output current to be adjusted, wherein the highest voltage value of the second voltage reference is higher than the first voltage reference, and the lowest voltage value thereof is equal to the first voltage reference; and
  the operation b0 is further configured to control the operation a2 so that:
  when the voltage difference higher than or equal to the first voltage threshold and lower than a second voltage threshold is detected at the end of the period of interruption, if the second voltage reference has not reached the lowest voltage value, then the second voltage reference is adjusted down by the operation a2;
  when the voltage difference higher than a third voltage threshold is detected at the end of the period of interruption, if the second voltage reference has not reached the highest voltage value, then the second voltage reference is adjusted up by the operation a2; and
  wherein the first voltage threshold is lower than the second voltage threshold, and the second voltage threshold is lower than the third voltage threshold.

10. The charging control method based on claim 9, wherein:
  when the output current lower than the second current reference by a current difference lower than a first current threshold is detected in the period of charging, if the second current reference has not reached the highest current value, then the second current reference with the limitation removed is adjusted up by the operation a1;
  when the current difference higher than or equal to a preset second current threshold and lower than a preset third current threshold is detected in the period of charging, if the second current reference has not reached the lowest current value, then the second current reference with the limitation removed is adjusted down by the operation a1; and
  when the current difference higher than or equal to the third current threshold is detected in the period of charging, if the second current reference has not reached the lowest current value, then the second current reference with the limitation removed is reset to the lowest current value by the operation a1; and
  wherein the first current threshold is lower than the second current threshold, and the second current threshold is lower than the third current threshold.

11. The charging control method of claim 10, wherein:
  periodically triggering interruption of charging in the operation b0 comprises: counting a reference clock signal and generating an interruption clock signal based on a result of counting, wherein the active interruption clock signal indicates the period of interruption, and the inactive interruption clock signal indicates the period of charging;
  detecting the current difference and controlling the operation a1 in the operation b0 comprises:
  the operation b11 of generating a first current detection signal, a second current detection signal and a third current detection signal based on the magnitude of the current difference, wherein the first current detection signal is active when the current difference is lower than the first current threshold, the second current detection signal is active when the current difference above is lower than the second current threshold, and the third current detection signal is active when the current difference above is lower than the third current threshold;
  the operation b12 of generating a current-up signal, a current-down signal and a current reset signal based on the interruption clock signal, the first current detection signal, the second current detection signal and the third current detection signal, wherein when the interruption clock signal is inactive, if the first current detection signal is active, then the current-up signal is set active, if the second current detection signal is inactive and the third current detection signal is active, then the current-down signal is set active, and if the third current detection signal is inactive, then the current reset signal is set active; and when the interruption clock signal is active, then the current reset signal is set active; and the operation b13 of performing a counting operation based on the reference clock signal, the current-up signal, the current-down signal and the current reset signal and outputting a result of current counting to the operation a1 for adjustment by the operation a1 based on the result of current counting, wherein each time the reference clock signal jumps from being inactive to an arriving active clock edge, if the current-up signal is active, then a counting operation to increase the result of current counting by a current counting step size is performed once, if the current-down signal is active, then a counting operation to decrease the result of current counting by a current counting step size is performed once; and if the current reset signal is active, then a counting operation to reset the result of current counting to the lowest current counting value is performed once, wherein the lowest current counting value corresponds to the lowest current value; and detecting the voltage difference, generating the charging termination signal and controlling the operation a2 in the operation b0 comprises:

the operation b21 of detecting the magnitude of the voltage difference and generating a first voltage detection signal, a second voltage detection signal and a third voltage detection signal based on the magnitude of the voltage difference, wherein the first voltage detection signal is active when the voltage difference is lower than the first voltage threshold, the second voltage detection signal is active when the voltage difference above is lower than the second voltage threshold, and the third voltage detection signal is active when the voltage difference above is lower than the third voltage threshold;

the operation b22 of generating an adjustment clock signal based on the interruption clock signal and generating the charging termination signal, a voltage-down signal and a voltage-up signal based on the interruption clock signal, the first voltage detection signal, the second voltage detection signal and the third voltage detection signal, wherein the adjustment clock signal is the inverted interruption clock signal; and when the interruption clock signal jumps from being active to an arriving inactive clock edge, if the first voltage detection signal is active, then the charging termination signal is set active, if the first voltage detection signal is inactive and the second voltage detection signal is active, then the voltage-down signal is set active, and if the third voltage detection signal is inactive, then the voltage-up signal is set active; and the operation b23 of performing a counting operation based on the adjustment clock signal, the voltage-up signal and the voltage-down signal and outputting a result of voltage counting to the operation a2 for adjustment by the operation a2 based on the result of the voltage counting, wherein each time the adjustment clock signal jumps from being inactive to an arriving active clock edge, if the voltage-up signal is active, then a counting operation to increase the result of voltage counting by a voltage counting step size is performed once, and if the voltage-down signal is active, then a counting operation to decrease the result of voltage counting by a voltage counting step size is performed once.

* * * * *